(12) United States Patent
Nagano

(10) Patent No.: US 10,679,036 B2
(45) Date of Patent: Jun. 9, 2020

(54) ELECTRONIC APPARATUS HAVING FINGER AUTHENTICATING FUNCTION

(71) Applicant: CANON KABUSHIKI KAISHA, Tokyo (JP)

(72) Inventor: Toshimune Nagano, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 167 days.

(21) Appl. No.: 15/642,392

(22) Filed: Jul. 6, 2017

(65) Prior Publication Data
US 2018/0012061 A1    Jan. 11, 2018

(30) Foreign Application Priority Data

Jul. 7, 2016    (JP) .................. 2016-135148

(51) Int. Cl.
G06K 9/00 (2006.01)
H04N 5/232 (2006.01)
H04N 5/235 (2006.01)

(52) U.S. Cl.
CPC ..... *G06K 9/00087* (2013.01); *G06K 9/00013* (2013.01); *G06K 9/00228* (2013.01); *G06K 9/00288* (2013.01); *G06K 9/00892* (2013.01); *H04N 5/2351* (2013.01); *H04N 5/2354* (2013.01); *H04N 5/23212* (2013.01); *H04N 5/23219* (2013.01); *H04N 5/23287* (2013.01)

(58) Field of Classification Search
None
See application file for complete search history.

(56) References Cited

U.S. PATENT DOCUMENTS

| 8,116,565 | B2 | 2/2012 | Takahashi | |
|---|---|---|---|---|
| 2001/0049785 | A1* | 12/2001 | Kawan | G06F 21/32 713/156 |
| 2002/0034319 | A1* | 3/2002 | Tumey | G06K 9/00087 382/116 |
| 2004/0008873 | A1* | 1/2004 | Sogo | G06K 9/00288 382/118 |

(Continued)

FOREIGN PATENT DOCUMENTS

| JP | 2007122529 A | * | 5/2007 |
|---|---|---|---|
| JP | 2007264958 A | | 10/2007 |

(Continued)

*Primary Examiner* — Kim Y Vu
*Assistant Examiner* — Nathan J Bloom
(74) *Attorney, Agent, or Firm* — Rossi, Kimms & McDowell LLP

(57) ABSTRACT

An electronic apparatus includes an authenticator configured to identify registered finger information that coincides with detected finger information by matching the detected finger information with the plurality of registered finger information in a predetermined order, an executor configured to execute a function corresponding to the registered finger information identified by the authenticator, a user identifier configured to identify the actual user among the plurality of registered users by acquiring user identification information representing the actual user or by performing a determination process configured to determine the actual user, and a controller configured to change the predetermined order according to the actual user identified by the user identifier.

8 Claims, 14 Drawing Sheets

(56) References Cited

U.S. PATENT DOCUMENTS

| | | |
|---|---|---|
| 2005/0188226 A1 | 8/2005 | Kasatani |
| 2006/0036358 A1* | 2/2006 | Hale .................... B60R 25/2009 701/45 |
| 2007/0090918 A1* | 4/2007 | Engstrom .......... G06K 9/00013 340/5.53 |
| 2007/0177766 A1* | 8/2007 | Kasahara ........... G06K 9/00993 382/115 |
| 2010/0060411 A1* | 3/2010 | Ikegami ................... G06K 9/00 340/5.53 |
| 2012/0230555 A1* | 9/2012 | Miura ................ G06K 9/00087 382/124 |
| 2015/0379251 A1* | 12/2015 | Komaki .................. G06F 21/32 726/19 |
| 2016/0328594 A1* | 11/2016 | Che .................... G06K 9/00046 |
| 2016/0328600 A1* | 11/2016 | Che ............................ G06T 7/11 |
| 2017/0063852 A1* | 3/2017 | Azar ....................... G06F 21/32 |

FOREIGN PATENT DOCUMENTS

| | | |
|---|---|---|
| JP | 2008276359 A | 11/2008 |
| JP | 2009294780 A | 12/2009 |
| JP | 2010211524 A | 9/2010 |

\* cited by examiner

| REGISTERED USER INFORMATION | REGISTERED FINGER INFORMATION | REGISTERED LENS FUNCTION |
|---|---|---|
| USER X | FINGERPRINT A | AF/MF SWITCH |
| | FINGERPRINT B | IMAGE STABILIZATION ON/OFF |
| | FINGERPRINT C | ILLUMINATION ON/OFF |
| USER Y | FINGERPRINT D | AF/MF SWITCH |
| | FINGERPRINT E | IMAGE STABILIZATION ON/OFF |
| | FINGERPRINT F | ILLUMINATION ON/OFF |
| ⋮ | | |

FIG. 5

USER MATCHING ORDER

| U=1 | USER X |
|---|---|
| U=2 | USER Y |

FUNCTION MATCHING ORDER

| | USER X | USER Y |
|---|---|---|
| F=1 | AF/MF SWITCH | AF/MF SWITCH |
| F=2 | ILLUMINATION ON/OFF | IMAGE STABILIZATION ON/OFF |
| F=3 | IMAGE STABILIZATION ON/OFF | ILLUMINATION ON/OFF |

FINGER MATCHING ORDER

| N=1 | N=2 | N=3 | N=4 | N=5 | N=6 |
|---|---|---|---|---|---|
| FINGER-PRINT A | FINGER-PRINT B | FINGER-PRINT C | FINGER-PRINT D | FINGER-PRINT E | FINGER-PRINT F |

FIG. 6

| REGISTERED USER INFORMATION | REGISTERED FINGER INFORMATION | REGISTERED FUNCTION |
|---|---|---|
| USER X | FINGERPRINT A | DISPLAY⇒MAP, SOUND⇒NO CHANGE |
| | FINGERPRINT B | DISPLAY⇒TELEVISION, SOUND⇒TELEVISION |
| | FINGERPRINT C | DISPLAY⇒RADIO, SOUND⇒RADIO |
| | FINGERPRINT G | DISPLAY⇒MUSIC, SOUND⇒MUSIC |
| USER Y | FINGERPRINT D | DISPLAY⇒MAP, SOUND⇒NO CHANGE |
| | FINGERPRINT E | DISPLAY⇒TELEVISION, SOUND⇒TELEVISION |
| | FINGERPRINT F | DISPLAY⇒RADIO, SOUND⇒RADIO |
| | FINGERPRINT H | DISPLAY⇒MUSIC, SOUND⇒MUSIC |
| ⋮ | | |

FIG. 13

ELECTRONIC APPARATUS HAVING FINGER AUTHENTICATING FUNCTION

BACKGROUND OF THE INVENTION

Field of the Invention

The present invention relates to an electronic apparatus, such as a camera and a car navigation apparatus, configured to execute a function according to a finger authentication result.

Description of the Related Art

This type of electronic apparatus sequentially matches, when detecting a feature of a finger of a user, such as a fingerprint, detected feature information (referred to as "detected finger information" hereinafter) against information of features of a plurality of fingers (referred to as "registered finger information" hereinafter) previously stored in a storage unit (memory). After identifying the registered finger information that coincides with the detected finger information or the finger of the user is authenticated, the electronic apparatus executes a function previously correlated with the instant finger (registered finger information).

However, the electronic apparatus having such a finger authenticating function has the following problems. The first problem is that as a registered finger information amount becomes larger in the storage unit, it may take a long time to match the detected finger function against the registered finger information and thus to execute a function corresponding to the authenticated finger. In particular, it takes a long time to authenticate a finger of a lower rank in the matching order. This problem is remarkable in an electronic apparatus that is shared by a plurality of users and enables each user to assign each of his fingers to one of a plurality of different functions. This is because it is necessary to discern the features of many fingers and thus to set a threshold for the finger authentication to be high. The second problem is that a finger feature may not be precisely detected due to sweat and an injury of the finger of the user and thus a user intended function may not be executed.

Japanese Patent Laid-Open No. ("JP") 2008-276359 discloses a finger authentication apparatus that estimates a person who is highly likely an actual user based on the use history of a user, such a finger authentication frequency and a using time slot, and sets a matching order that preferentially matches the detected finger information with the registered finger information of the person. JP 2007-264958 discloses a finger authentication apparatus that adjusts a detection sensitivity based on the temperature, humidity, and pressure when the feature of the finger is detected.

However, according to the fingerprint authentication apparatus disclosed in JP 2008-276359, the user estimated based on the use history is less reliable and the finger authentication takes a long time for the user who has not little used the finger authentication. The finger authentication apparatus disclosed in JP 2007-264958 needs a sensor configured to detect the temperature, humidity, and pressure, in addition to a fingerprint sensor configured to detect a fingerprint.

SUMMARY OF THE INVENTION

The present invention provides an electronic apparatus that has a simple configuration and enables a plurality of users to comfortably and quickly use each function through a finger authentication.

An electronic apparatus according to one aspect of the present invention is configured to execute a plurality of functions. The electronic apparatus includes a memory configured to store a plurality of pieces of registered finger information respectively representing a plurality of features of a plurality of fingers of a plurality of registered users and the plurality of functions corresponding to the registered finger information, a detector configured to generate detected finger information that contains the feature by detecting a feature of a finger of an actual user, an authenticator configured to identify the registered finger information that coincides with the detected finger information by matching the detected finger information with the plurality of registered finger information in a predetermined order, an executor configured to execute the function corresponding to the registered finger information identified by the authenticator, a user identifier configured to identify the actual user among the plurality of registered users by acquiring user identification information representing the actual user or by performing a determination process configured to determine the actual user, and a controller configured to change the predetermined order according to the actual user identified by the user identifier.

Further features of the present invention will become apparent from the following description of exemplary embodiments with reference to the attached drawings.

BRIEF DESCRIPTION OF THE DRAWINGS

FIG. 5 illustrates an example of registered user information, registered finger information, and registered function information according to the second embodiment.

FIG. 6 explains a finger matching order setting method according to the second embodiment.

FIG. 13 illustrates an example of registered user information, registered finger information, and registered function information according to the third embodiment.

DESCRIPTION OF THE EMBODIMENTS

Referring now to the accompanying drawings, a description will now be given of embodiments of the present invention.

First Embodiment

Figure 1:
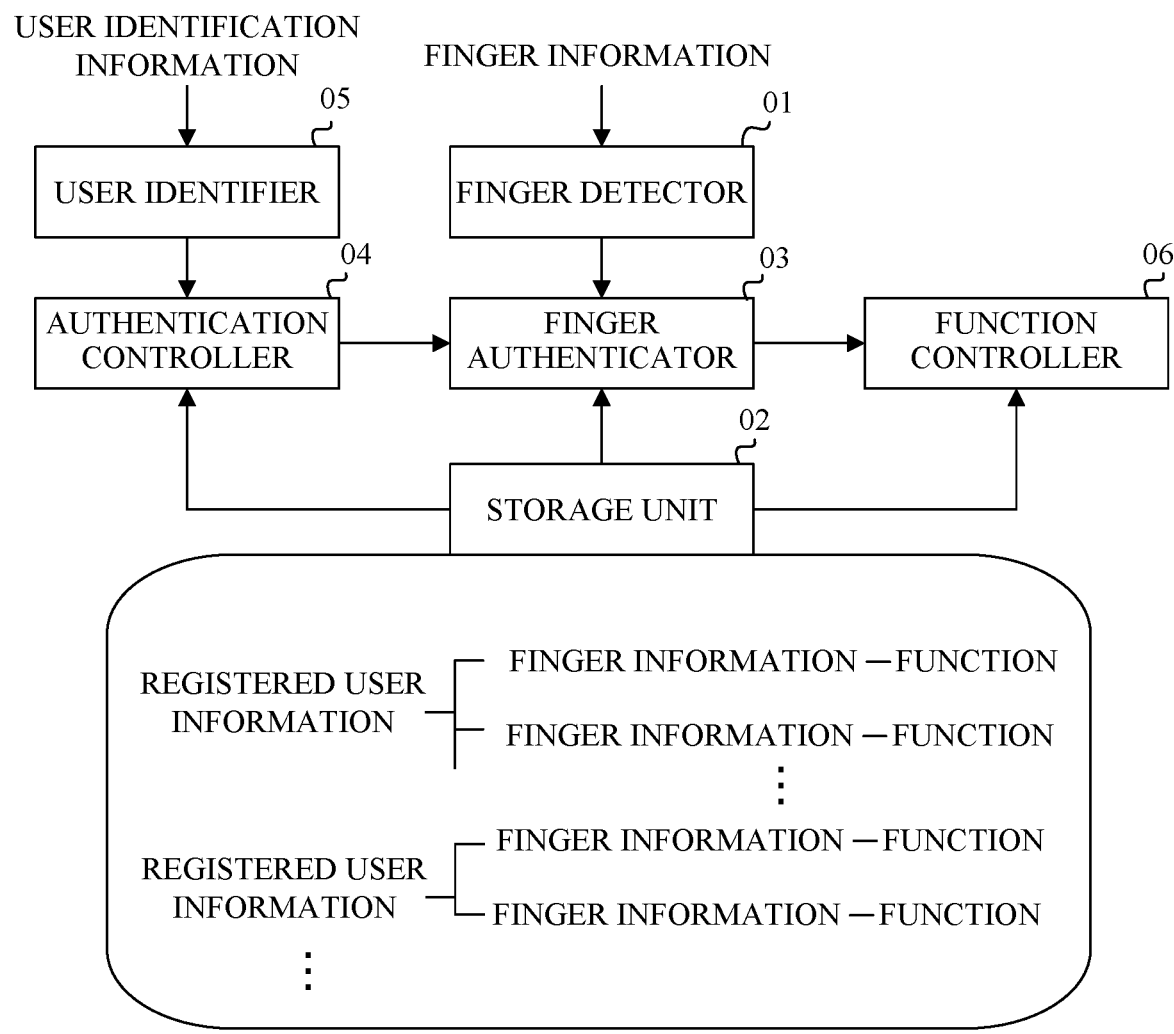
FIG. 1 is a block diagram of a configuration an electric apparatus according to a first embodiment of the present invention.

FIG. 1 illustrates a configuration of an electronic apparatus having a finger authenticating function according to a first embodiment of the present invention. This electronic apparatus can execute a plurality of functions that are different from the finger authenticating function. The electronic apparatus includes a finger detector 01, a storage unit (memory) 02, a finger authenticator 03, an authentication controller 04, a user identifier 05, and a function controller (executor) 06.

The finger detector 01 detects a feature of a finger of a user, such as a fingerprint, and generates finger information. The finger information generated by the finger detector 01 will be referred to as "detected finger information" hereinafter. The storage unit 02 previously stores a plurality of pieces of registered user information representing a plurality of users (registered users), a plurality of pieces of registered finger information representing features of a plurality of fingers (such as an index finger, a middle finger, and a ring finger) of the plurality of users, and the plurality of functions correlated with the registered finger information.

The finger authenticator 03 matches (compares) the detected finger information obtained by the finger detector 01, with the plurality of pieces of registered finger information stored (registered) in the storage unit 02 in a predetermined order (referred to as a "matching order" hereinafter), identifies the registered finger information that coincides with the detected finger information, and thereby authenticates the finger of the user. More specifically, the finger authenticator 03 calculates a matching degree or level between the detected finger information and the registered finger information, and determines that the detected finger information coincides with the registered finger information when the matching degree is equal to or higher than a predetermined authentication threshold.

The user identifier 05 performs a determination process that acquires the user identification information as information of a user (referred to as an "actual user" hereinafter) who is actually using the electronic apparatus or determines the actual user, and thereby identifies (authenticates) the actual user. The user identifier 05 may be integrated with the finger detector 01, and may identify the actual user by using the detected finger information acquired by the finger detector 01 as the user identification information. The actual user determination process may be performed by using face information detected in image data generated by the electronic apparatus.

The authentication controller 04 sets (changes) a finger authentication condition, such as the matching order of the registered finger information with the detected finger information and the authentication threshold in the finger authenticator 03, according to the actual user identified by the user identifier 05. The function controller 06 executes a function (registered finger information that coincides with the detected finger information) corresponding to the finger authenticated by the finger authenticator 03 among a plurality of functions stored in the storage unit 02.

Second Embodiment

Figure 2:
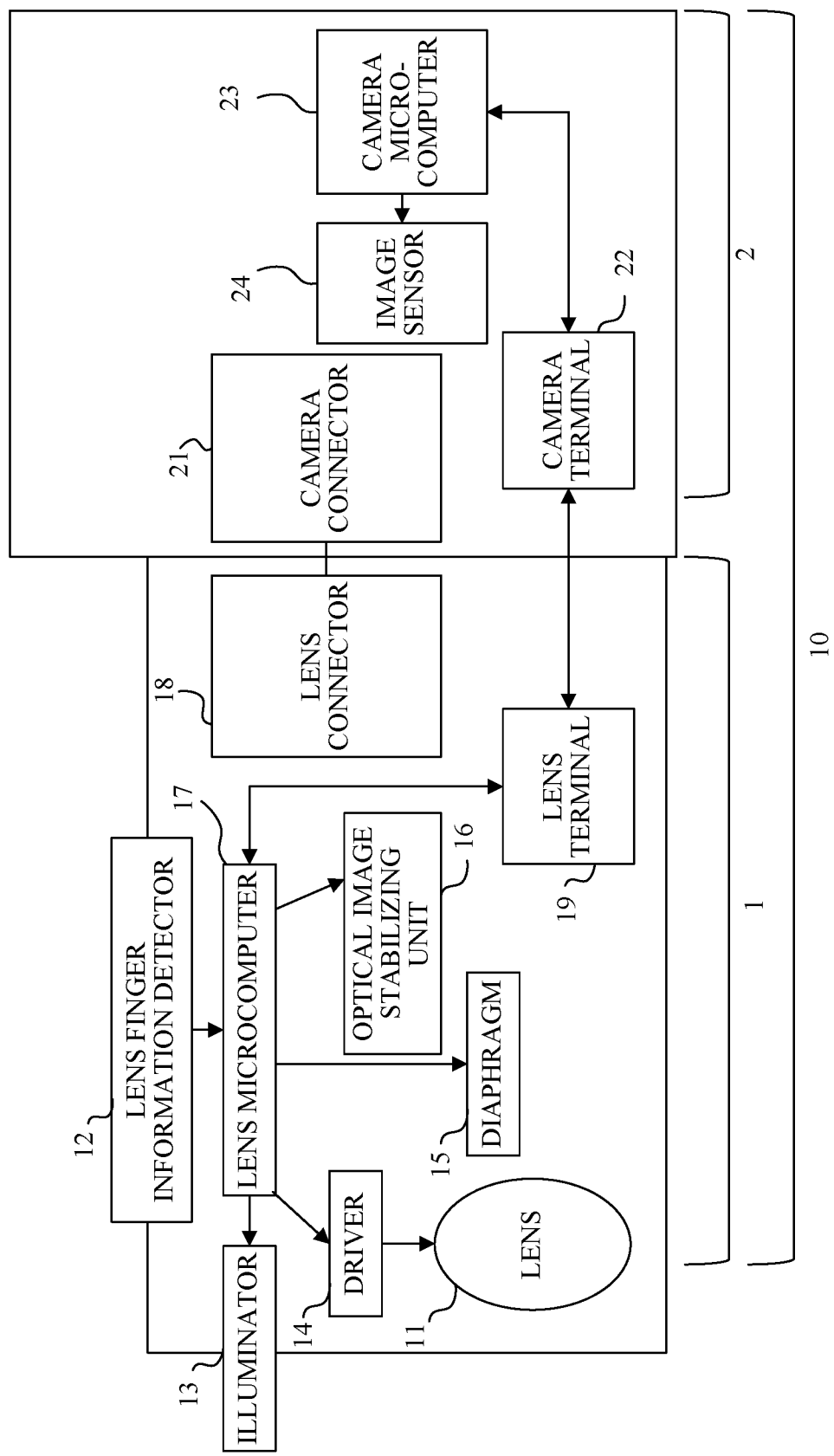
FIG. 2 is a block diagram of a configuration of a camera system that includes an interchangeable lens according to a second embodiment of the present invention.

FIG. 2 illustrates a configuration of a camera system where the electronic apparatus illustrated in the first embodiment is an interchangeable lens. A camera system 10 includes an interchangeable lens 1 as an optical apparatus, and a camera body (another apparatus) 2 to which the interchangeable lens 1 is detachably attached.

The interchangeable lens 1 includes an imaging lens 11, and a lens finger information detector 12 corresponding to the finger detector 01 described in the first embodiment. The interchangeable lens 1 includes an illuminator 13 that emits illumination light, and a driver 14 configured to drive, through a motor, a focus lens configured to change a focus state in the imaging lens 11 and a magnification varying lens configured to vary a magnification in the imaging lens 11. The interchangeable lens 1 includes a diaphragm (stop) 15 configured to adjust a light amount, an optical image stabilizing unit 16 configured to reduce an image blur caused by a camera vibration, and a lens microcomputer 17 as a microcomputer or a MPU configured to control the illuminator 13, the driver 14, the diaphragm 15, and the optical image stabilizing unit 16. Hereinafter, a lens state is changed when at least one of the illuminator 13, the driver 14, the diaphragm 15, or the optical vibration unit 16 is operated or a control of at least one of these components is changed, and thereby the state of the interchangeable lens 1 is changed. The interchangeable lens 1 does not necessarily include all of the illuminator 13, the driver 14, the diaphragm 15, the optical image stabilizing unit 16, and may include an additional component.

The lens microcomputer 17 includes the storage unit 02 according to the first embodiment as an internal memory, and serves as the user identifier 05 in FIG. 1. The lens microcomputer 17 serves as the finger authenticator 03 in the first embodiment that identifies the registered finger information (authenticated finger information) that coincides with the detected finger information output from the lens finger information detector 12 among a plurality of pieces of registered finger information stored in the internal memory for each registered user information. The lens microcomputer 17 serves as the authentication controller 04 in the first embodiment configured to set the matching order of the plurality of pieces of registered finger information with the detected finger information and the authentication threshold used to determine the coincidence between them, and the function controller 06 in the first embodiment configured to execute a function corresponding to the authenticated finger information.

The camera body 2 includes a camera microcomputer 23 as a microcomputer or an MPU, and an image sensor 24 as a photoelectric conversion element, such as a CMOS sensor. The image sensor 24 photoelectrically converts (captures) an object image formed by light that has passed the imaging lens 11, the diaphragm 15, and the optical image stabilizing unit 16. The camera microcomputer 23 generates image data through a variety of image processes to an output signal from the image sensor 24. The camera microcomputer 23 controls an imaging condition, such as an ISO speed of the image sensor 24, a shutter speed in the imaging, and a white balance in generated image data. The camera microcomputer 23 is connected to the lens microcomputer 17 via a camera terminal 22 and a lens terminal 19 so that they can communicate with each other.

The camera microcomputer 23 has a known face recognition function that recognizes a face in image data which is being acquired by live-view imaging. The camera microcomputer 23 can store, in its internal memory, a plurality of pieces of face information and corresponding personal information having the recognized face, and perform a determination process that determines a person having a recognized face by comparing the detected face with the stored face. The lens microcomputer 17 can receive as the user identification information the information of the person (actual user) determined by the determination process from the camera microcomputer 23. The lens microcomputer 17 may have a face recognition function for the image data received from the camera microcomputer 23, include a storage unit configured to store a plurality of pieces of face information, and perform the determination process configured to determine the actual user with the recognized face based on the face information.

While the electronic apparatus described in the first embodiment is an interchangeable lens in the lens interchangeable camera system in this embodiment, the interchangeable lens may be a lens integrated camera in which the imaging lens is integrated with the camera body. In this case, the lens microcomputer 17 in FIG. 2 and the camera microcomputer 23 is an integrated microcomputer, which executes the above controls and functions.

Figure 3:
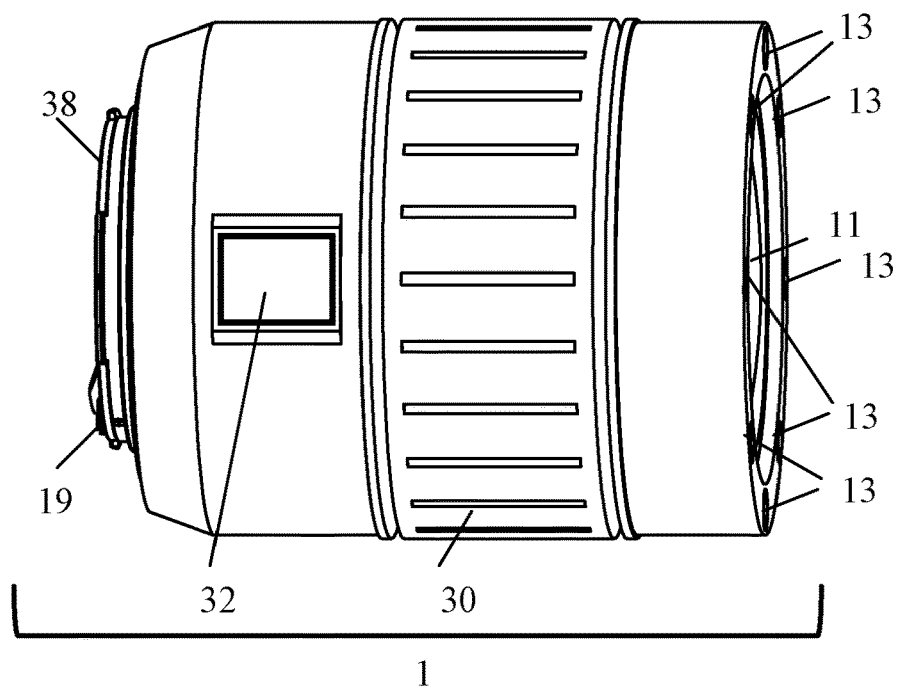
FIG. 3 is an overview of an interchangeable lens according to the second embodiment.
Figure 4:
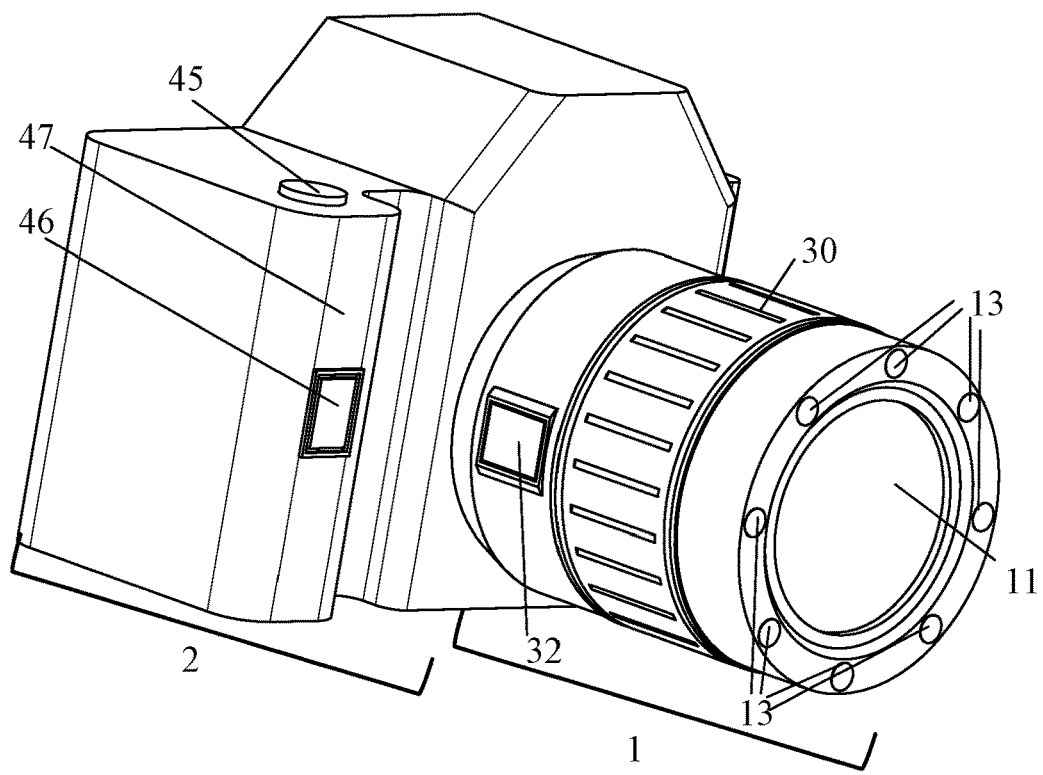
FIG. 4 is an overview of a camera system according to the second embodiment.

FIG. 3 illustrates an overview of the interchangeable lens 1 according to this embodiment. FIG. 4 illustrates an overview of the camera system according to this embodiment. The interchangeable lens 1 includes the lens terminal 19 as a communication unit between a lens mount 38 as a connector with the camera body 2, and the camera body 2. The interchangeable lens 1 includes a lens fingerprint sensor 32 as a sensor unit of the finger information detector 12 illustrated in FIG. 2 on its outer circumference.

The lens fingerprint sensor 32 includes many electrodes and a protective film (sensor plane) that covers these electrodes. The finger information detector 12 reads electric charges that depend on a fingerprint pattern and are generated for respective electrodes when the finger is pressed against the sensor plane on the lens fingerprint sensor 32, and acquires as the detected finger information a fingerprint image obtained from the electric charges. The lens microcomputer 17 calculates a matching degree between the detected finger information (referred to as a "detected fingerprint" hereinafter) and the registered finger information (referred to as a "registered fingerprint" hereinafter), and determines that the detected fingerprint coincides with the registered fingerprint when the matching degree is equal to or higher than the authentication threshold. The matching degree may be calculated based on the number of matched feature points, such as a break or branch of a fingerprint between the detected finger print and the registered fingerprint, or by using a pattern matching method or a frequency analysis method or the like.

The fingerprint sensor is not limited to this type, and may be a sensor that optically reads a fingerprint and a sensor that reads the fingerprint when the pressed finger is slid. The finger information detector 12 is not limited to a fingerprint detection, and may use another finger authentication method, such as a detector that detects a vein and thereby determines the finger.

The focus lens can be driven by the motor in the interchangeable lens 1, such as during an autofocus (AF), as described above. On the other hand, in a manual focus (MF), the focus lens is moved as the focus ring 30 is rotated which is provided around the outer circumference in the interchangeable lens 1. The interchangeable lens 1 thus has a switching function between the AF and the MF (referred to as an "AF/MF switching function" hereinafter). The interchangeable lens 1 includes the optical image stabilizing unit, as described above, and has a function of turning on and off the image stabilization by the optical image stabilizing unit (referred to as an "image stabilization ON/OFF function" hereinafter). The interchangeable lens 1 includes a plurality of LEDs as the illuminators 13 on the front end of the lens barrel. The illuminator 13 illuminates the object by emitting light in macro imaging. The interchangeable lens 1 has a function of turning on and off the light from each illuminator 13 (referred to as an "illumination ON/OFF function" hereinafter). Each of the AF/MF switch function, the image stabilization ON/OFF function, and the illumination ON/OFF function is included in a plurality of functions which the interchangeable lens 1 has (referred to as a "lens functions" hereinafter).

The camera body 2 illustrated in FIG. 4 is connected to the interchangeable lens 1 by bayonet-coupling the unillustrated camera mount with the lens mount 38 in the interchangeable lens 1. The camera body 2 includes a camera grip 47 that enables the user to hold the camera body 2 with his right hand. The camera grip 47 has a camera fingerprint sensor 46 as a camera finger information detector. The camera microcomputer 23 illustrated in FIG. 2 can identify (authenticate) the user having a fingerprint when the fingerprint detected by the camera fingerprint sensor 46 coincides with one of the previously stored fingerprints of the users. The camera fingerprint sensor 46 is configured similarly to the lens fingerprint sensor 32. The camera fingerprint sensor 46 may use a sensor for optically reading the fingerprint or a sensor for reading the fingerprint when the pressed finger is slid or a sensor for detecting the finger instead of the fingerprint by another method.

A shutter switch 45 is provided on the top of the camera grip 47. When the shutter switch 45 is pressed, an image is captured so as to generate image data for recording use based on the imaging condition set by the camera microcomputer 23. The imaging condition can be changed by operating the unillustrated operating unit in the camera body 2. The camera body 2 has a plurality of imaging modes, such as a macro mode and a self-imaging (selfie) mode, and the imaging mode can be set by operating the operation unit. The self-imaging mode can be set by detecting a contact of a finger of a user with the electronic viewfinder, etc. in addition to the operation of the operation unit.

FIG. 5 illustrates a correspondence relationship among registered user information (referred to as a "registered user" hereinafter) stored in the internal memory in the lens microcomputer 17, a registered fingerprint for each registered user, and a lens function (referred to as a "registered lens function" hereinafter) registered for each registered fingerprint. The internal memory stores registered fingerprints A, B, and C for a registered user X, and registered fingerprints D, E, and F for a registered user Y. The AF/MF switch function is stored as a registered lens function corresponding to each of the registered fingerprints A and D. The image stabilization ON/OFF function is stored as a registered lens function corresponding to each of the registered fingerprints B and E. The illumination ON/OFF function is stored as a registered lens function corresponding to each of the registered fingerprints C and F.

Referring now to FIG. 6, a description will be given of a setting method of a finger matching order N as the matching order of the registered fingerprint with the detected fingerprint. Each element in a variety of matching orders, such as U=1, F=1, and N=1, may be considered as a rank in the corresponding matching order. Assume that there are two registered users in the interchangeable lens 1 or the user X and Y, and there are three registered lens functions or the AF/MF switch function, the image stabilization ON/OFF function, and the illumination ON/OFF function. A description will now be given of the setting method of the finger matching order N based on a user matching order U and a function matching order F. Each of the number of registered users and the number of registered lens functions is merely illustrative, and another number may be used. The number of registered lens functions may be changed for each registered user.

In the user matching order U, the registered user who is more likely the actual user has a higher rank among the registered users. In the function matching order F, the lens function which is determined more likely selected based on the use history that indicates the status of use of the past lens functions of each registered user has a higher rank. The status of use relates to the interchangeable lens, such as a used lens function, a used imaging mode, and an actual user.

Now, the first user is set to the user X, the second user is set to the user Y in the user matching order U. In addition, the first function is set to the AF/MF switch function, the second function is set to the illumination ON/OFF ON/OFF function, and the third function is the image stabilization function in the function matching order F for the user X. On the other hand, the first function is set to the AF/MF switch function, the second function is set to the image stabilization ON/OFF function, and the third function is the illumination ON/OFF function in the function matching order F for the user Y. While this embodiment the function matching order F is different according to the registered user, the function matching order F may be the same for each registered user. In other words, for both users X and Y, a detected fingerprint may be matched against the fingerprint corresponding to each function in order of the AF/MF switch function, the illumination ON/OFF function, and image stabilization ON/OFF function. In this case, the matching order may be changed based on the surrounding circumstance and the use history. More specifically, as illustrated later with reference to FIG. 9, for example, the function matching order may be changed according to the surrounding circumstance, such as the brightness in the imaging environment.

Figure 7:
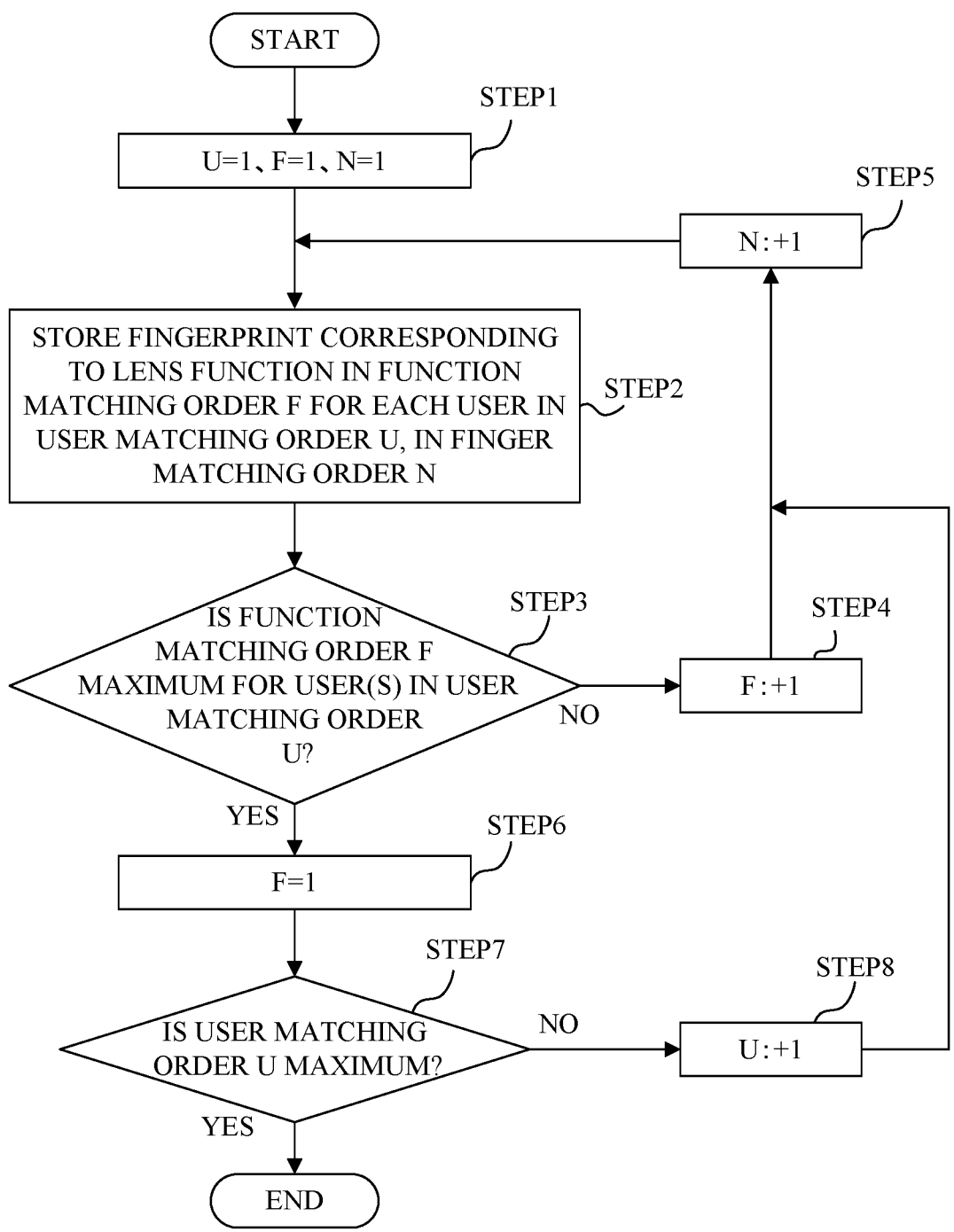
FIG. 7 is a flowchart of the finger matching order setting process according to the second embodiment.

A flowchart in FIG. 7 illustrates a flow of the finger matching order setting process for setting the finger matching order N based on the user matching order U and the function matching order F. The lens microcomputer 17 executes this process and the following processes in accordance with an optical apparatus control program (electronic apparatus control program) as a computer program.

In the step 1, the lens microcomputer 17 substitutes 1 for the user matching order U, the function matching order F, and the finger matching order N, and moves to the step 2 (or selects the first ranks, such as U=1, F=1, and N=1, in these matching orders).

In the step 2, the lens microcomputer 17 stores in the finger matching order N, the registered fingerprint corresponding to each registered lens function in the function matching order F and each registered user in the user matching order U, and then moves to the step 3.

In the step 3, the lens microcomputer 17 determines whether the function matching order F for each registered user in the user matching order U is maximum. The lens microcomputer 17 moves to the step 6 when determining that it is maximum, and to the step 4 when determining that it is not maximum. When the user X in FIG. 6 is used by an example, there are three lens functions assigned to the user X. Then, the lens microcomputer 17 determines that the function matching order F is maximum if F=3, and moves to the step 6. On the other hand, if F=1 or F=2, the microcomputer 17 determines that the function matching order F is not maximum, and moves to the step 4.

In the step S4, the lens microcomputer 17 increments the rank number in F by 1, and moves to the step 5. In the step 5, the lens microcomputer 17 increments the rank number in N by 1, and moves to the step 2. In the step 6, the lens microcomputer 17 selects the first rank in F and moves to the step 7.

In the step 7, the lens microcomputer 17 determines whether the user matching order U is maximum. When determining that the user matching order U is maximum, the lens microcomputer 17 ends this process. When determining that the user matching order U is not maximum, the lens microcomputer 17 moves to the step 8. In the example of FIG. 6, there are two registered users and thus the lens microcomputer 17 determines that the user matching order U is maximum if U=2 and ends the procedure. The lens microcomputer 17 determines that the user matching order U is not maximum if U=1 and moves to the step 8. In the step 8, the lens microcomputer 17 increments the rank number in U by 1, and moves to the step 5.

The above finger matching order setting process enables the lens microcomputer 17 to compare the detected fingerprint with the registered finger print in accordance with the user matching order and to compare the detected fingerprint with the registered fingerprint in order of a more likely lens function used for each registered user. The example illustrated in FIG. 6 sets the order (A→C→B→D→E→F) of the registered fingerprint to be compared with the detected fingerprint as illustrated by the "finger matching order." When the detected fingerprint is compared with the registered fingerprint in this finger matching order, the registered fingerprint that is more likely to coincide with the detected fingerprint can be preferentially compared, and the lens function that is more likely to be used can be executed quickly after the detected fingerprint is acquired.

Next follows a description of a user matching order setting method. Assume that a plurality of registered users are arranged in a registration order in the initial user matching order. For example, as illustrated in FIG. 6, the users X and Y are arranged in order of the user X→the user Y. The initial user matching order may be updated based on the use history of the interchangeable lens 1. Thereby, the user matching order can be updated based on the use history of the interchangeable lens 1 so that a more frequent user is preferentially matched, and it is possible to shorten a time period from when the detected fingerprint is acquired to when the corresponding lens function is executed.

Figure 8:
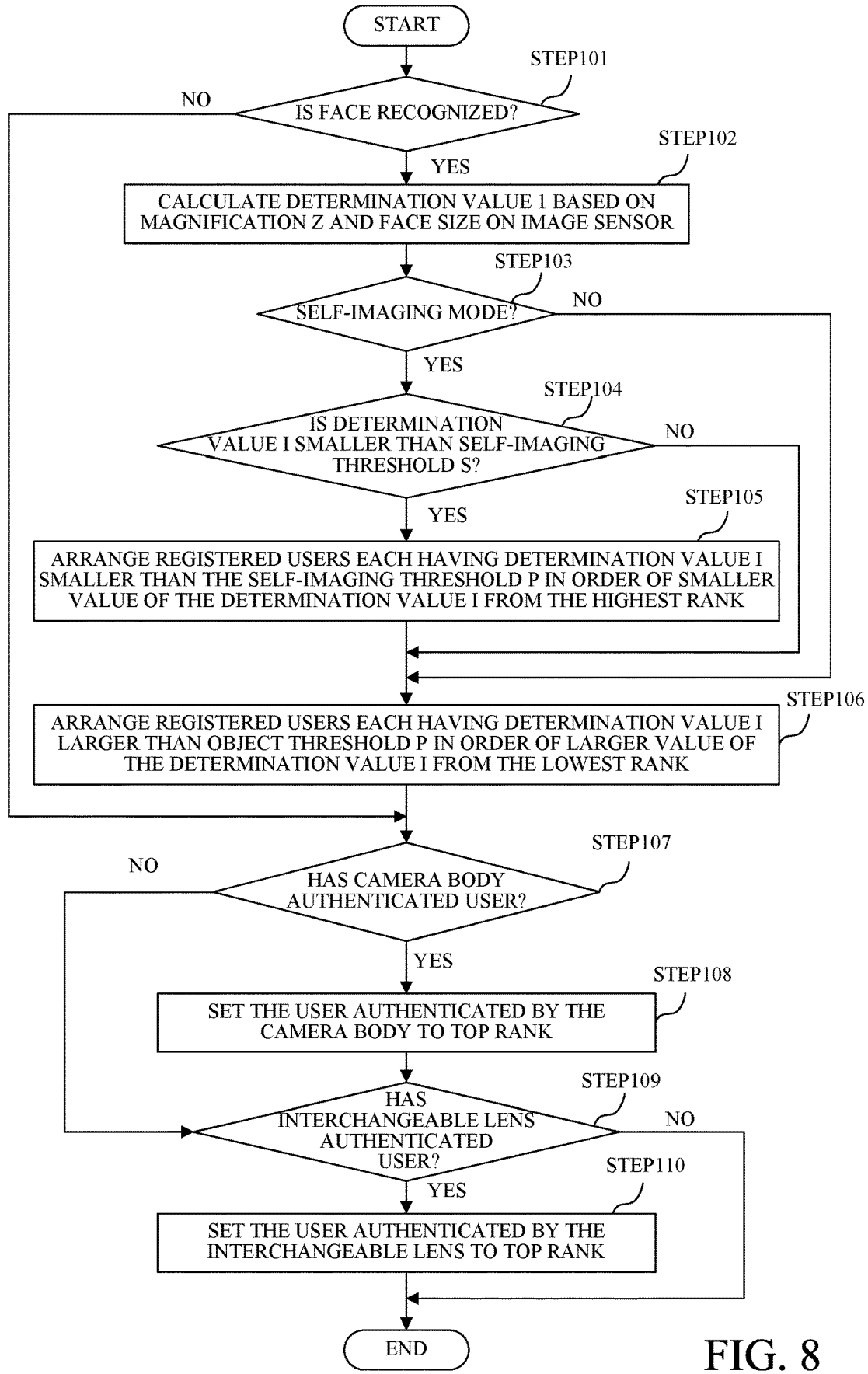
FIG. 8 is a flowchart of a user matching order setting process according to the second embodiment.

A flowchart illustrated in FIG. 8 illustrates a flow of the user matching order setting process that rearranges the initial user matching order according to the status of use and changes (updates) the user matching order. The steps 101 to 106 provide processes that determine the actual user based on the image data that is being acquired in the live-view imaging and rearrange a plurality of registered users in order of a likelihood of the actual user. The steps 107 to 110 provide processes that move up a rank (referred to as a "matching rank" hereinafter) in the matching order of the registered fingerprint for the registered user previously authenticated as the actual user in the lens microcomputer 17 or the camera microcomputer 23 with the detected fingerprint.

In the step 101, the lens microcomputer 17 communicates with the camera microcomputer 23 and determines whether a face is recognized by a face recognition function in the image data that is being acquired in the live-view imaging. When determining that the face is recognized, the lens microcomputer 17 moves to the step 102, and when determining that the face is not recognized, the lens microcomputer 17 moves to the step 107.

In the step 102, the lens microcomputer 17 calculates a determination value I based on a magnification Z and the size of the face on the image sensor 24 (in the image data). The magnification Z is a value determined based on a focal length in the interchangeable lens 1 and a back focus from the image side lens surface in the interchangeable lens 1 to the image sensor 24 in the camera system 10. Since a human face is approximately equally sized, the determination value I corresponding to the distance to the object from the camera 2 can be calculated based on the magnification Z. In other words, the determination value I becomes larger as the distance from the camera 2 is longer. Thereafter, the lens microcomputer 17 moves to the step 103.

In the step 103, the lens microcomputer 17 determines whether the imaging mode of the camera 2 is a self-imaging (selfie) mode. When determining that the imaging mode is the self-imaging mode, the lens microcomputer 17 moves to the step 104, and when determining that the imaging mode is not the self-imaging mode, the lens microcomputer 17 moves to the step 106.

In the step 104, the lens microcomputer 17 determines whether the determination value I is smaller than a self-imaging threshold S. When determining that the determination value I is smaller than the self-imaging threshold S, the lens microcomputer 17 moves to the step 105, and when determining that the determination value I is equal to or larger than the self-imaging threshold S, the lens microcomputer 17 moves to the step 106. The self-imaging threshold S is set to a distance (such as 50 cm) sufficiently shorter than a stretched arm length of a self-imaging person.

In the step 105, the lens microcomputer 17 rearranges the registered users in the user matching order in order of a smaller value of the determination value I from the top rank. This rearrangement enables a registered fingerprint of a registered user closer to the camera 2 in the self-imaging among the registered users who have imaged themselves to be preferentially compared with the detected fingerprint. Thereafter, the lens microcomputer 17 moves to the step 106.

In the step 106, the lens microcomputer 17 determines whether the determination value I of each registered user is larger than an object threshold P. The lens microcomputer 17 arranges the registered users having the larger determination values in order of a larger determination value I from the lowest rank in the user matching order. The object threshold P is set to a distance (such as 100 cm) sufficiently longer than the stretched arm length of the self-imaging person. In other words, the object threshold P is provided so as to specify a registered user who is too distant to image himself. A registered fingerprint of a registered user who is too distant from the camera 2 to image himself is compared with the detected fingerprint later (with a low priority). In other words, the registered fingerprint of the registered user near the camera is preferentially compared with the detected fingerprint. Thereafter, the lens microcomputer 17 moves to the step 107.

In the step 107, the lens microcomputer 17 communicates with the camera microcomputer 23 and determines whether the camera microcomputer 23 has authenticated the actual user. The lens microcomputer 17 moves to the step 108 when the camera microcomputer 23 has authenticated the actual user, and moves to the step 109 when the camera microcomputer 23 has not yet authenticated the actual user.

In the step 108, the lens microcomputer 17 sets the actual user authenticated by the camera microcomputer 23 to the highest rank in the user matching order. In the step 109, the lens microcomputer 17 determines whether the lens microcomputer 17 has authenticated the actual user. The lens microcomputer 17 moves to the step 110 when it has authenticated the actual user, and ends this procedure when it has not yet authenticated the actual user.

In the step 110, the lens microcomputer 17 sets the actual user which it has authenticated to the top rank in the user matching order, and ends this procedure.

The processes of the steps 101 to 106 preferentially compare the registered fingerprint of the self-imaging user with the detected fingerprint, and defer the comparison of the registered fingerprint of the non-selfie user with the detected fingerprint. This configuration can properly set the user matching order based on the status of use of the "actual user" and shorten a time period from when the detected fingerprint is acquired to when the corresponding lens function is executed.

This procedure moves up the matching rank of the self-imaging user when the imaging mode is set to the self-capturing mode. However, even when the self-capturing mode is not set, an alternative embodiment may move up the matching rank of the user who is determined to image himself. In other words, the matching rank of the user may be moved up where his image capturing is estimated based on the determination value I without determining a setting of the self-capturing mode in the step 103.

The processes of the steps 107 to 110 enable the registered fingerprint of the actual user authenticated by the lens microcomputer 17 to be preferentially compared with the detected fingerprint. When the lens microcomputer 17 has not yet authenticated the actual user, the registered fingerprint of the actual user which the camera microcomputer 23 has authenticated is preferentially compared with the detected fingerprint. This configuration can also properly set the user matching order based on the status of use of the "actual user" and shorten a time period from when the detected fingerprint is acquired to when the corresponding lens function is executed. In addition, when the actual user which the lens microcomputer 17 authenticates takes preference over the actual user which the camera microcomputer 23 authenticates, the user matching order can be properly set even where the interchangeable lens 1 and the camera body 2 are operated (used) by separate users.

When the camera body 2 does not have user authentication function, the camera microcomputer 23 does not authenticate the actual user in the step 107.

Figure 9:
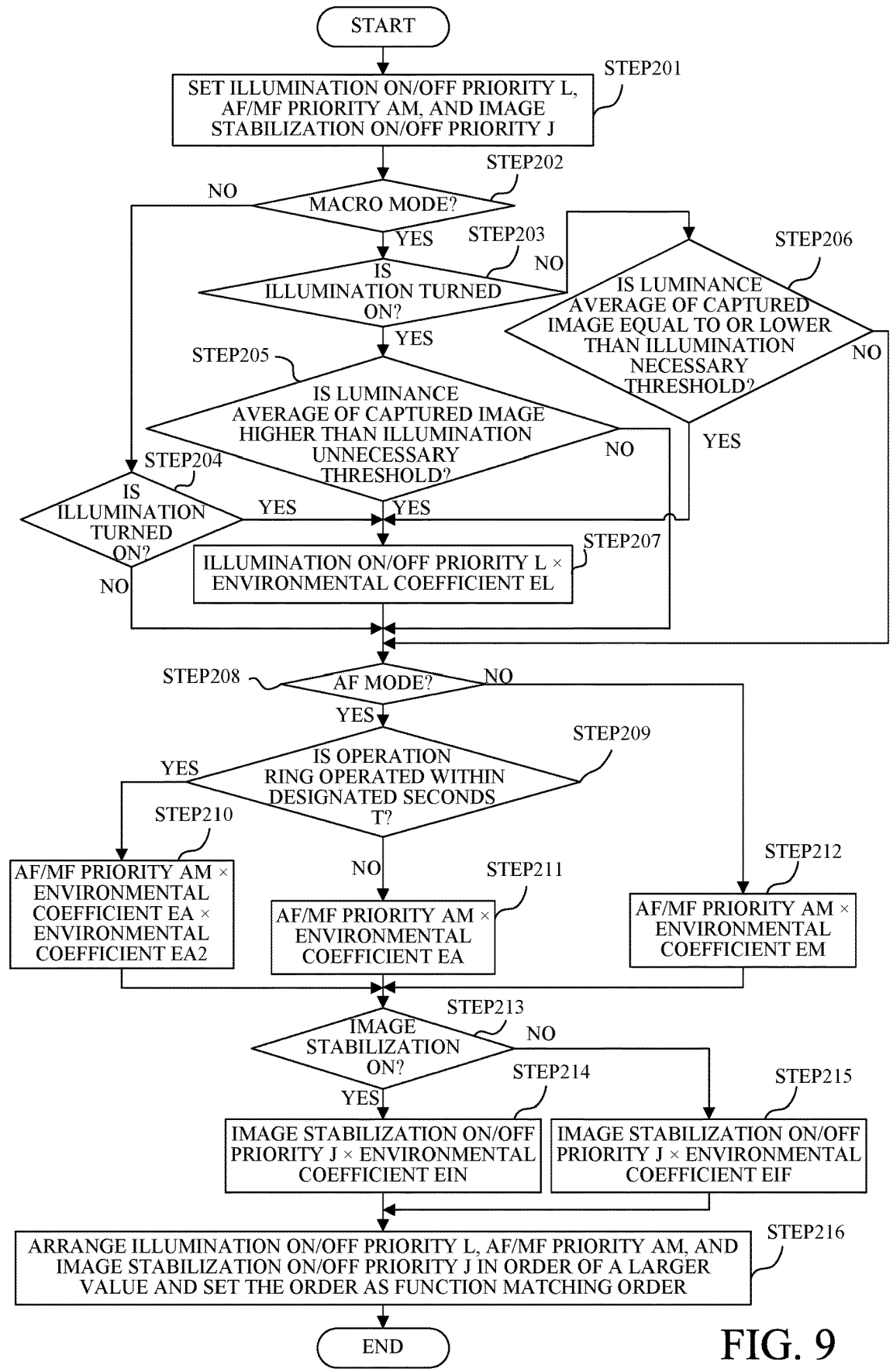
FIG. 9 is a flowchart of a function matching order setting process according to the second embodiment.

A flowchart in FIG. 9 illustrates a flow of the function matching order setting process that changes (updates) the initial function matching order according to the user and status of use. This process is performed for the registered lens function of the actual user authenticated by the lens microcomputer 17 or the camera microcomputer 23. The function matching order of the registered lens function for other registered users is set in order of a higher ratio of the selection number for each lens function to the selection number of all lens functions. This process may be performed for the registered lens functions of all registered users, and the best function matching order may be set for each registered user.

In this process, the lens microcomputer 17 determines the priority of the illumination ON/OFF function in the steps 202 to 207, and the priority of the AF/MF switch function in the steps 208 to 212. The lens microcomputer 17 determines the priority of the image stabilization ON/OFF function in the steps 213 to 215, and changes (updates) the function matching order based on the priority of each lens function in the step 216.

In the step 201, the lens microcomputer 17 sets a priority L of the illumination ON/OFF function, a priority AM of the AF/MF switch function, and a priority J of the image stabilization ON/OFF function. Each of the priorities L, AM, and J has a different value for each registered user, and uses a value made by dividing the selection number of each lens function of the registered user by the total successful number of finger authentications of the registered user. In other words, the frequency (ratio) at which each registered user selects each lens function is set to the priority of the lens function. Thereafter, the lens microcomputer 17 moves to the step 202.

In the step 202, the lens microcomputer 17 communicates with the camera microcomputer 23, and determines whether the imaging mode is a macro mode. When determining that the imaging mode is the macro mode, the lens microcomputer 17 moves to the step 203, and when determining that the imaging mode is not the macro mode, the lens microcomputer 17 moves to the step 204.

In the step 203, the lens microcomputer 17 determines whether the illuminator (referred to as an "LED" hereinafter) 13 is turned on. When determining that the LED 13 is turned on, the lens microcomputer 17 moves to the step 205, and when determining that the LED 13 is turned off, the lens microcomputer 17 moves to the step 206.

In the step 204, the lens microcomputer 17 determines whether the LED 13 is turned on. When determining that the LED 13 is turned on, the lens microcomputer 17 moves to the step 207, and when determining that the LED 13 is turned off, the lens microcomputer 17 moves to the step 208.

In the step 205, the lens microcomputer 17 communicates with the camera body 2, and determines whether a luminance average of the image data (captured image) that is being acquired in the live-view imaging is equal to or higher than an illumination unnecessary threshold. When determining that the luminance average is equal to or higher than the illumination unnecessary threshold, the lens microcomputer 17 moves to the step 207, and when determining that the luminance average is lower than the illumination unnecessary threshold, the lens microcomputer 17 moves to the step 208. The illumination unnecessary threshold is set to a value that provides an excessively bright luminance average when the LED 13 is turned on and the luminance average has that value. In other words, the lens microcomputer 17 moves to the step 207 when the luminance average is too bright and the LED 13 is turned on. In the step 205, the lens microcomputer 17 may determine whether it is unnecessary to turn on the LED 13 based on the ratio of part having overexposure (clipped whites or luminance saturation) in the captured image, instead of using the luminance average.

In the step 206, the lens microcomputer 17 communicates with the camera microcomputer 23, and determines whether the luminance average of the captured image is equal to or lower than the illumination necessary threshold. The camera microcomputer 17 moves to the step 207 when determining that the luminance average is equal to or lower than the illumination necessary threshold, and moves to the step 208 when determining that the luminance average is higher than the illumination necessary threshold. The illumination necessary threshold is set to a value that provides an excessively dark luminance average when the LED 13 is turned off and the luminance average has that value. In other words, the lens microcomputer 17 moves to the step 207 when the luminance value is too dark when the LED 13 is turned off. In the step 206, the lens microcomputer 17 may determine whether it is necessary to turn on the LED 13 based on the ratio of part having underexposure (crashed shadows) in the captured image, instead of using the luminance average.

In the step 207, the lens microcomputer 17 multiplies the priority L of the illumination ON/OFF function by the environmental coefficient EL, and moves to the step 208. This embodiment uses 2 for a fixed value larger than 1, but this is merely illustrative. This embodiment may use another value as the environmental coefficient EL. The environmental coefficient EL may be stepwise varied as a variable value according to a parameter such as the turning on and off of the LED 13 and the luminance average of the captured image in the steps 202 to 205.

In the step 208, the lens microcomputer 17 determines whether the AF is selected (or the AF mode is set) or MF is selected (or the MF mode is set). The lens microcomputer 17 moves to the step 209 in the AF mode, and to the step 212 in the no-AF (or MF) mode.

In the step 209, the lens microcomputer 17 determines whether the focus operation ring 30 is operated within a predetermined time period t (seconds) before the AF mode is determined to be set in the step 208. The lens microcomputer 17 moves to the step 210 when the focus operation ring 30 has been operated, and moves to the step 211 when the focus operation ring has not yet been operated. The predetermined time period t is a presumed time period from when a user operating the focus operation ring 30 for the MF notices the unchanged focus state (AF mode) to when the user places his finger on the lens fingerprint sensor 32, which is 5 seconds in this embodiment. This predetermined time period t is merely illustrative, and another time period may be set or the predetermined time period t may be differently for each registered user based on the use history for each registered user.

In the step 210, the lens microcomputer 17 multiplies the priority AF of the AF/MF switch function by a product between the environmental coefficients EA and EA2, and moves to the step 213. The environmental coefficient EA is a value obtained by dividing the imaging number in the MF mode by a user (or the number of images obtained by imaging) by the total imaging number in the AF and MF modes by the user. In other words, the environmental coefficient EA corresponds to a frequency in use of the MF mode by the user. This embodiment uses 2 for the environmental coefficient EA2 as the fixed value larger than 1. This is merely illustrative, and another value may be used for the environmental coefficient EA2. The environmental coefficient EL2 may be stepwise varied as a variable value according to a parameter such as an operation speed of the focus operation ring 30 and a time period from when the focus operation ring 30 is operated to when the authentication is made.

In the step 211, the lens microcomputer 17 multiplies the priority AF of the AF/MF switch function by the environmental coefficient EA, and moves to the step 213.

In the step 212, the lens microcomputer 17 multiplies the priority AF of the AF/MF switch function by the environmental coefficient EM. The environmental coefficient EM is a value made by dividing the imaging number in the AF state by the user by the imaging number of the user. In other words, the environmental coefficient EM is a ratio of the image captured by the user to the image captured by the AF. Thereafter, the lens microcomputer 17 moves to the step 213.

In the step 213, the lens microcomputer 17 determines whether the image stabilization by the optical image stabilizing unit 16 is turned on or off. The lens microcomputer 17 moves to the step 214 when the image stabilization is turned on, and moves to the step 215 when the image stabilization is turned off.

In the step 214, the lens microcomputer 17 multiplies the priority J of the image stabilization ON/OFF function by an environmental coefficient EIN. The environmental coefficient EIN is a value made by multiplying the imaging number in the image stabilization off state by a user (the number of images obtained by imaging) by the total imaging number in the image stabilization on and off states by the user. In other words, the environmental coefficient EIN corresponds to a frequency in use of the image stabilization by the user. Thereafter, the lens microcomputer 17 moves to the step 216.

In the step 215, the lens microcomputer 17 multiplies the priority J of the image stabilization ON/OFF function by an environmental coefficient EIF. The environmental coefficient EIF is a value made by the imaging number in the image stabilization on state by a user (the number of images obtained by imaging) by the total imaging number in the image stabilization on and off states by the user. In other words, the environmental coefficient EIF corresponds to a frequency in nonuse of the image stabilization by the user, and the lens microcomputer 17 moves to the step 216.

In the step 216, the lens microcomputer 17 sets as the function matching order, the priority L of the illumination ON/OFF function, the priority AM of the AF/MF switch function, and the priority J of the image vibration ON/OFF function, in order of a higher value, and ends this procedure.

The processes of the steps 201 and 216 can move up a matching rank of a registered fingerprint corresponding to a lens function that is highly likely to be selected based on the use history of the user, against the detected fingerprint. In other words, the registered fingerprint corresponding to the lens function which the user more frequency uses (or with a higher frequency in use) can be preferentially compared with the detected fingerprint, and consequently a time period from when the detected fingerprint is obtained to when the corresponding lens function is executed can be shortened.

The processes of the steps 202 to 207 and 216 can move up a matching rank of a registered fingerprint corresponding to the illumination ON/OFF function to be compared with the detected fingerprint when the LED 13 is turned off, the imaging mode is the macro mode, and the captured image is dark. In other words, when the LED 13 is likely turned on, the registered fingerprint corresponding to the turning on of the LED 13 is preferentially compared with the detected fingerprint. When the LED 13 is turned on, the imaging mode is not the macro mode or the captured image is sufficiently bright, a matching rank of a registered fingerprint corresponding to the illumination ON/OFF function can also be made higher. In other words, when the LED 13 is likely turned off, the registered fingerprint corresponding to the turning off of the LED 13 is preferentially compared with the detected fingerprint. This configuration can shorten a time period from when the detected fingerprint is obtained to when the LED 13 is turned on or off.

The processes of the steps 208 to 212 and 216 can move up a matching rank of a registered fingerprint corresponding to the AF/MF switch function where the AF mode is set when the focus operation ring 30 is operated. In other words, when the user is highly likely to change the AF mode to the MF mode, the registered fingerprint corresponding to the switch to the MF mode is preferentially compared with the detected fingerprint. This configuration can move up a matching rank of a registered fingerprint corresponding to the switch to a focusing mode among the AF mode and the MF mode which has a higher frequency in use for imaging or is more likely used. This configuration can shorten a time period from when the detected fingerprint is obtained to when the focusing mode is switched to a user desired mode.

The processes of the steps 213 to 216 can move up a matching rank of a registered fingerprint corresponding to the switch to one of the image stabilization on and off states which has a higher frequency in use for imaging or a more likely to be used. This configuration can shorten the time period from when the detected fingerprint is obtained to when the state is switched to one of the image stabilization on and off states which the user desires.

Figure 10:
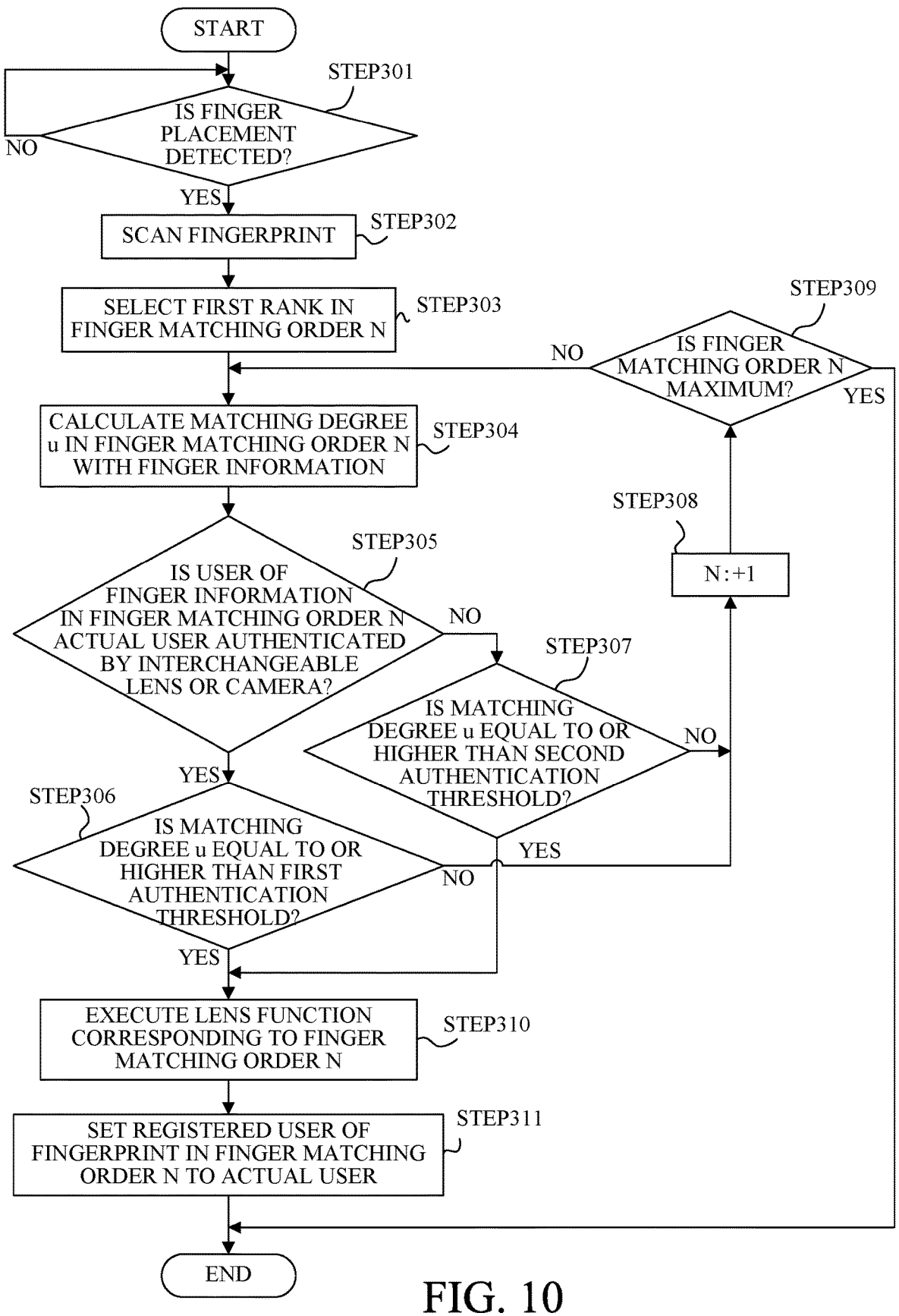
FIG. 10 is a flowchart of a function changing process for the interchangeable lens in the camera system according to the present invention.

Referring to a flowchart illustrated in FIG. 10, a description will be given of the process for executing the registered lens function corresponding to the detected fingerprint acquired through the lens fingerprint sensor 32 illustrated in FIG. 4 by the lens microcomputer 17. This process can be performed anytime if the camera system is in the imageable state. Alternatively, the lens fingerprint sensor 32 may include a fingerprint detection start switch, and this process may be performed when the switch is turned on.

In the step 301, the lens microcomputer 17 determines whether it detects the user places his finger on the lens fingerprint sensor 32. When detecting that the finger is not placed, the lens microcomputer 17 repeats the step 301, and when detecting that the finger is placed, the lens microcomputer 17 moves to the step 302 so as to instruct the lens fingerprint sensor 32 to read (scan) the fingerprint. Then, the lens microcomputer 17 moves to the step 303.

In the step 303, the lens microcomputer 17 selects the first rank in the finger matching order N to 1, and moves to the step 304.

In the step 304, the lens microcomputer calculates the matching degree u between the registered fingerprint in the finger matching order N and the detected fingerprint, and moves to the step 305.

In the step 305, the lens microcomputer 17 determines whether the lens microcomputer 17 or the camera microcomputer 23 has authenticated the registered user corresponding to the registered fingerprint in the finger matching order N as the actual user. The lens microcomputer 17 moves to the step 306 when the registered user has been authenticated as the actual user, and moves to the step 307 when the registered user has not yet been authenticated.

In the step 306, the lens microcomputer 17 determines whether the matching degree u is equal to or higher than a first authentication threshold. The lens microcomputer 17 moves to the step 310 when determining that the matching degree u is equal to or higher than the first authentication threshold, and moves to the step 308 when determining that the matching degree u is lower than the first authentication threshold.

In the step 307, the lens microcomputer 17 determines whether the matching degree u is equal or higher than a second authentication threshold. The lens microcomputer 17 moves to the step 310 when the matching degree u is equal to or higher than the second authentication threshold, and moves to the step 308 when the matching degree u is lower than the second authentication threshold. The first and second authentication thresholds will be descried later.

In the step 308, the lens microcomputer 17 increments the rank number in the finger matching order N by 1, and moves to the step 309.

In the step 309, the lens microcomputer 17 determines whether the finger matching order N is maximum. The lens microcomputer 17 ends this process when the finger matching order N is maximum, and moves to the step 304, when the finger matching order N is not maximum.

In the step 310, the lens microcomputer 17 executes the registered lens function corresponding to the registered fingerprint of the finger matching order N, and moves to the step 311.

In the step 311, the lens microcomputer 17 identifies the registered user corresponding to the registered fingerprint of the finger matching order N as the actual user of the interchangeable lens 1, and ends this process.

This procedure sets the first authentication threshold lower than the second authentication threshold so as to make available an authentication even when the matching degree u is low. In addition, this embodiment sets the first authentication threshold to a value used to discern differences among the plurality of fingerprints of fingers of the same registered user, and sets the second authentication threshold to a value used to discern the differences of all fingerprints of the fingers of all registered users. In other words, the registered user who is identified as the actual user by the lens microcomputer 17 or the camera microcomputer 23 is authenticated with the first authentication threshold lower than that for the unidentified registered user.

A user who is not identified as the actual user by the process of the step 311 is identified as the actual user if he was the just previous user. For example, when the finger state of the user who uses the camera system for a long time changes due to sweat and contamination, the matching degree u may lower. Even in this case, if the user is a just previous user or the camera microcomputer 23 has authenticated the user, the first authentication threshold compared with the matching degree u becomes lower. Therefore, the user can continuously execute each lens function through the lens fingerprint sensor 32. Even when the user has an injury on his finger, he is authenticated as the actual user through another finger and the authentication threshold can be made lower. Even when the user has an injured finger, he is identified as an actual user by his other finger. Thus, even when the injured finger is scanned by the lens fingerprint sensor 32, the intended lens function can be executed.

When the fingerprint of the user different from the previously authenticated actual user is detected and authenticated, the registered user corresponding that fingerprint can be identified as the actual user. Once the authentication is performed after the actual user is changed, the fingerprint of the changed actual user can be easily authenticated and the changed user can comfortably operate the lens.

This embodiment lowers the matching rank of the registered fingerprint of the registered user who is too far from the camera to image himself in the step 106 in FIG. 8, but the registered fingerprint of the registered user may be excluded from the object compared with the detected fingerprint.

This embodiment uses a general lens function in the interchangeable lens as the lens function to be changed by the finger authentication, but may use another lens function as the lens function to be changed by the finger authentication. For example, where the interchangeable lens is configured to switch the magnification varying function and the focusing function through the operation of the operation ring and the magnification varying/focusing switch registered fingerprint is set, a matching rank of the magnification varying/focusing switch registered fingerprint may be moved down when the operation ring is operated. Where a vibration sensor, such as a gyro sensor, provided in the interchangeable lens detects a vibration of the camera and the optical image stabilizing unit is turned off, a matching rank of the registered fingerprint for the image stabilization ON/OFF function may be moved up.

While this embodiment changes the authentication sensitivity by changing the authentication threshold for the matching degree between the detected fingerprint and the registered fingerprint, the feature point to be extracted may be changed where the fingerprint authentication is based on the feature point, such as the break and branch on the detected fingerprint. For example, a processing time period can be shortened and a lens can be more comfortably operated by efficiently calculating the matching degree based on the difference of the feature point of the fingerprint of the user.

This embodiment authenticates the actual user through the fingerprint, but may use a method that uses the face recognition function described above. The camera body may authenticate the actual user through an iris recognition for the eye of the user who views the optical viewfinder, rather than through the fingerprint authentication or the face authentication through the face recognition function.

While this embodiment can authenticate the user with the camera body mounted (connected) with the interchangeable lens, the actual user may be identified through a communication with an apparatus that is not directly connected to the camera system, such as a smartphone. In this case, the actual user can be determined (identified) based on a distance between the camera system and the smartphone. The apparatus is not limited to the smartphone, and the actual user may be identified through a communication with another apparatus that can store the personal identification information.

Third Embodiment

Figure 11:
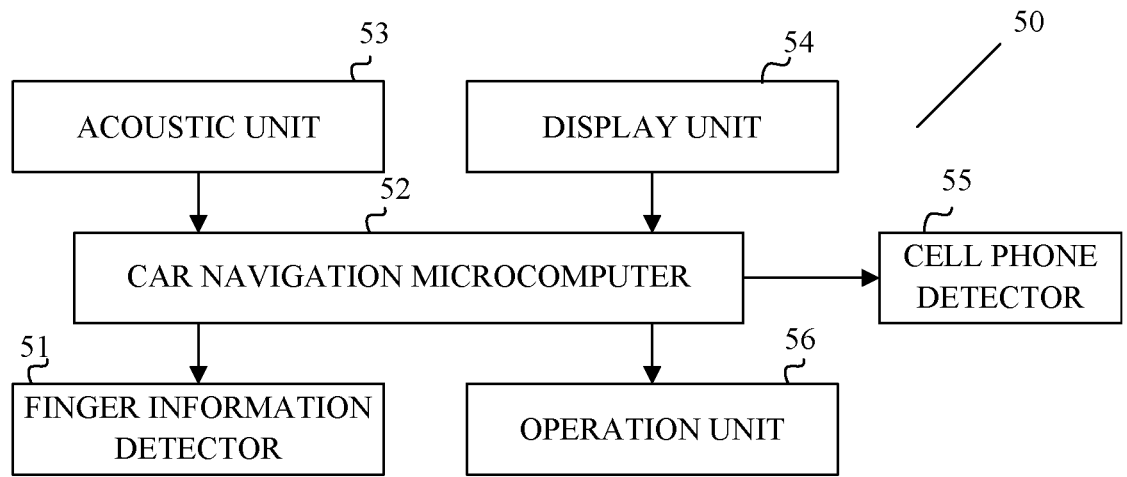
FIG. 11 illustrates a car navigation system according to a third embodiment of the present invention.

FIG. 11 illustrates a car navigation apparatus as an electronic apparatus according to a third embodiment of the present invention. A car navigation apparatus 50 is installed in an automobile. The car navigation apparatus 50 includes a finger information detector 51, an acoustic unit 53, a display unit 54, an operation unit 56, and a car navigation microcomputer 52 as a function controller (referred to as a "navigation microcomputer" hereinafter).

The navigation microcomputer 52 includes an MPU, etc., and controls the acoustic unit 53 and the display unit 54 based on finger information detected by the finger information detector 51 or the operation unit 56. Thereby, the navigation microcomputer 52 enables the acoustic unit 53 and the display unit 54 to execute a plurality of functions different from the finger authenticating function. The navigation microcomputer 52 serves as the storage unit 02, the finger authenticator 03, the function controller 06, and the authentication controller 04 in the first embodiment. The navigation microcomputer 52 compares the finger information (detected fingerprint) obtained by the finger information detector 51 with the registered finger information (registered fingerprint), and instructs the acoustic unit 53 and the display unit 54 to execute the function corresponding to the authenticated registered fingerprint once matching is detected, similar to the lens microcomputer 17 in the second embodiment.

The car navigation apparatus 50 includes a cell phone detector 55 as the user identifier 05 in the first embodiment. The cell phone detector 55 detects the cell phone in the automobile and identifies the user corresponding to the cell phone as the user identification information. A correspondence relationship between the cell phone and the user may be stored in the internal memory in the navigation microcomputer 52 or in the cell phone. A unique cell phone number in each cell phone may be directly used for the user identification information. The navigation microcomputer 52 may set (change) the finger authentication condition, such as the matching order between the registered fingerprint and the detected fingerprint and the authentication threshold, according to the user identification information acquired by the cell phone detector 55.

Figure 12:
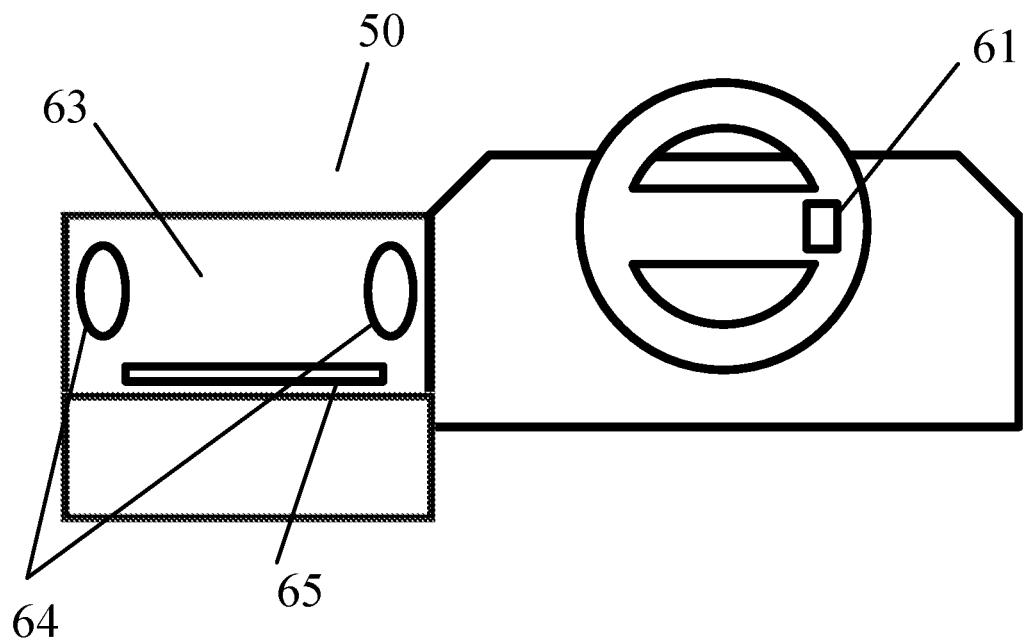
FIG. 12 illustrates a dashboard that includes the car navigation system according to the third embodiment.

FIG. 12 illustrates a dashboard in the automobile into which the car navigation apparatus 50 according to this embodiment is incorporated. A speaker 64 is included in the acoustic unit 53 in FIG. 11, and a liquid crystal panel 63 is included in the display unit 54 in FIG. 11. The car navigation apparatus 50 turns on as the automobile is powered on, and the liquid crystal panel 63 displays and outputs a navigation map and a television image. The acoustic apparatus 53 outputs a navigation voice, a television sound, a radio sound, and music. In other words, the car navigation apparatus 50 has a plurality of functions, such as a car navigation function of outputting the navigation map and the navigation voice, a television function of outputting the television image and the television sound, a radio function of outputting the radio sound, and a music function of outputting music. According to the car navigation function, the liquid crystal panel 63 can display the navigation map while the television sound, the radio sound, or music are output, and the navigation voice may be output if necessary. According to the radio function and the music function, the liquid crystal panel 63 may display a selected radio station or music information.

In order to select (or switch) the above function in the car navigation apparatus 50, the user (driver) operates an operation switch 65 or uses a finger authenticating function through a fingerprint sensor 61 included in the finger information detector 51 in FIG. 11. The operation switch 65 is located near the liquid crystal panel 63, and the fingerprint sensor 61 is disposed on a steering wheel. Since the user usually grasps the steering wheel, it is convenient to select a plurality of functions through the fingerprint sensor 61 on the steering wheel. The fingerprint sensor 61 may use a component similar to the lens and camera fingerprint sensor 32 and 46 described in the second embodiment.

The car navigation apparatus 50 houses the navigation microcomputer 52 and the cell phone detector 55 illustrated in FIG. 11.

FIG. 13 illustrates a correspondence relationship stored in the internal memory in the navigation microcomputer 52, among registered user information (referred to as a "registered user" hereinafter), a registered fingerprint for each registered user, and a function registered for each registered fingerprint (referred to as a "registered function" hereinafter). The internal memory stores registered fingerprints A, B, C, and G for a registered user X, and registered fingerprints D, E, F, and H for a registered user Y. The car navigation function (for display the navigation map and maintaining the sound) is stored as a registered function corresponding to the registered fingerprints A and D, the television function is stored as a registered function corresponding to the registered fingerprints B and E, and the radio function is stored as a registered function corresponding to the registered fingerprints C and F. The music function is stored as a registered function corresponding to the registered fingerprints G and H. FIG. 13 merely illustrates an example of the registered function corresponding to the registered fingerprint, and each user may freely set arbitrary registered function. For example, a function for maintaining the display and for outputting music may be set to the registered fingerprint G.

Similar to the second embodiment, this embodiment sets a finger matching order Nk based on the user matching order Uk and the function matching order Fk. The setting method and setting process (finger matching order setting process) of the finger matching order Nk are different from those of the second embodiment in number of function but similar to the setting method and setting process illustrated in FIGS. 6 and 7, and a description thereof will be omitted.

Figure 14:
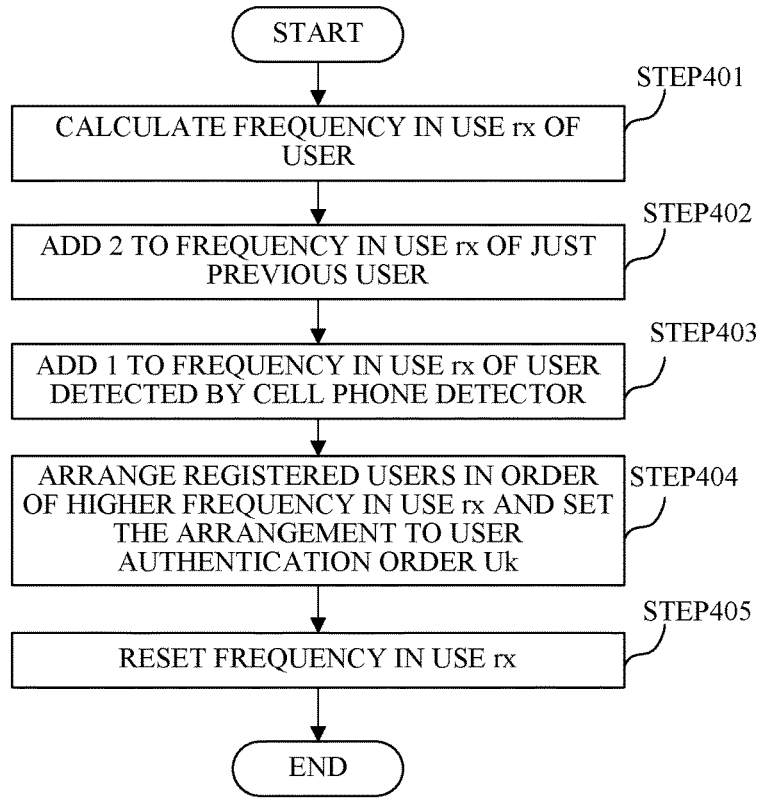
FIG. 14 is a flowchart of a user matching order setting process according to the third embodiment of the present invention.

Referring now to a flowchart illustrated in FIG. 14, a description will be given of the user matching order setting process configured to set the user matching order Uk according to this embodiment. The navigation microcomputer 52 executes the finger matching order setting process and the following processes according to the optical apparatus control program (electronic apparatus control program) as a computer program.

In the step 401, the navigation microcomputer 52 calculates a frequency in use rx of each registered user. The frequency in use rx is a ratio of the successful number of finger authentications by a registered user to the total successful number of finger authentications of all registered users.

In the step 402, the navigation microcomputer 52 adds 2 to the frequency in use rx of the just previous, registered user (actual user). The just previous, registered user (actual user) is an actual user detected (authenticated) through the fingerprint sensor 61 just after the power is turned on, and assume that there is no registered user just after the power is turned on. Thereafter, the navigation microcomputer 52 moves to the step 403.

In the step 403, the navigation microcomputer 52 adds 1 to the frequency in use rx of the registered user detected (authenticated) through the cell phone detector 55, and moves to the step 404.

In the step 404, the navigation microcomputer 52 sets the user matching order Uk by arranging the registered users in order of a higher frequency in use rx, and moves to the step 405.

In the step 405, the navigation microcomputer 52 resets the frequency in use rx of each registered user, and ends this procedure.

The frequency in use rx is a value obtained by dividing the successful number of finger authentications of a certain registered user by the successful number of finger authentications of all registered users, as described above, and thus does not exceed 1. Thus, the frequency in use rx of the just previous, registered user to which 2 is added in the step 402 is always the highest value, and that actual user is the highest ranker in the user matching order Uk set in the step 404. Thereby, the registered fingerprint of the just previous, registered user is the highest rank in the matching rank. Since the fingerprint sensor 61 is provided onto the steering wheel, a person other than the person who sits in the driver's seat is less likely to place his finger on the fingerprint sensor 61. In particular, when the automobile is driven, a person other than the driver is less likely to touch the fingerprint sensor 61 on the steering wheel. This configuration can determine (identify) that the registered user authenticated through the fingerprint sensor 61 is highly likely the actual user.

In order to add 1 to the frequency in use rx of the registered user authenticated through the cell phone detector 55 in the step 403, a rank in the user matching order Uk can be moved up next to the just previous, registered user. The registered user detected by the cell phone detector 55 is likely to carry the cell phone in the automobile, and when there are a plurality of detected registered users, it is determined that one of them sits on the driver's seat and places his finger on the fingerprint sensor 61. Hence, even when the actual user is not just previously authenticated through the fingerprint sensor 61, a rank in the user matching order Uk of the registered user who is determined as the actual user can be moved up. Since the ranks in the user matching order Uk of a plurality of detected registered users are arranged in order of a higher frequency in use, a matching rank of the registered user who is likely the actual user can be moved up.

Figure 15:
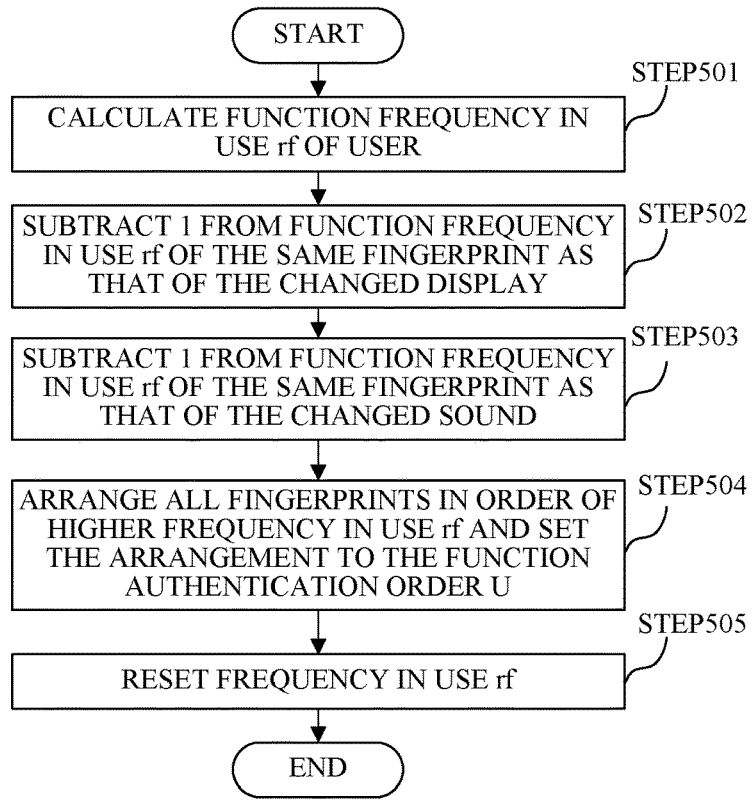
FIG. 15 is a flowchart of a function matching order setting process according to the third embodiment.

Referring now to a flowchart illustrated in FIG. 15, a description will be given of a function matching order setting process that arranges the initial function matching order according to the status of use and changes (updates) the function matching order according to this embodiment. This process is performed for a registered user who is a just previous user or has been authenticated through the cell phone detector 55. A function matching order for other registered users is set in order of a higher ratio of the selection number of each function to the selection number of all functions (total function selecting number). Alternatively, this process may be performed for all registered lens functions for all registered users, and the optimal function matching order may be set for each registered function.

In the step 501, the navigation microcomputer 52 calculates the function frequency in use rf of the registered user. The function frequency in use rf is a ratio made by dividing the successful number (each function selecting number) of finger authentications in each registered fingerprint of the registered users by the total successful number of finger authentications of that registered user.

In the step 502, the navigation microcomputer 52 subtracts 1 from the function frequency in use rf corresponding to the registered fingerprint among all registered fingerprints of the registered user, in which the display on the liquid crystal panel 63 coincides with the change function after the function is selected. For example, for the user X illustrated in FIG. 13, the display of the television image is maintained even when the television function is selected while the liquid crystal panel 63 displays the television image. Thus, 1 is subtracted from the function frequency in use corresponding to the registered fingerprint B for the user X. Thus, the function frequency in use rf corresponding to the registered fingerprint in which the display on the liquid crystal panel 63 does not change even after the function is selected can be made lower than that of another registered fingerprint. Thereafter, the navigation microcomputer 52 moves to the step 503.

In the step 503, the navigation microcomputer 52 subtracts 1 from the function frequency in use rf corresponding to the registered fingerprint among all registered fingerprints of the registered user, in which the sound from the speaker 64 coincides with the change function after the function is selected. For example, for the user X, the music sound is maintained even when the music function is selected while the music is output. Thus, 1 is subtracted from the function frequency in use corresponding to the registered fingerprint G for the user X. This configuration can make lower the function frequency in use rf corresponding to the registered fingerprint in which the sound from the speaker 64 does not change even after the function is selected, than that of another registered fingerprint. Thereafter, the navigation microcomputer 52 moves to the step 504.

In the step 504, the navigation microcomputer 52 arranges all registered fingerprints of the registered user in order of a higher function frequency in use rf, sets the arrangement to the function matching order U, and moves to the step 505.

In the step 505, the navigation microcomputer 52 resets the function frequency in use rf corresponding to each registered function, and ends this process.

Since the function frequency in use rf is a value obtained by dividing the successful number of finger authentications in each registered fingerprint of the registered user by the total successful number of finger authentications of the registered user, as described above, the function frequency in use rf is smaller than 1 and larger than 0. Thus, even when the steps 502 and 503 authenticate the finger, if 1 is subtracted from the function frequency in use corresponding to the registered fingerprint in which the function does not change, the function frequency in use can be made smaller than that corresponding to another registered fingerprint. As a result, the function frequency in use corresponding to the registered fingerprint in which the function is changed by the finger authentication becomes relatively large and a matching rank of the registered fingerprint can be moved up. In other words, since a user who places his finger on the fingerprint sensor 61 intends to change a function, a priority of the registered fingerprint (or selected function) to be compared with the detected fingerprint can be moved up according to the intent of the user.

Figure 16:
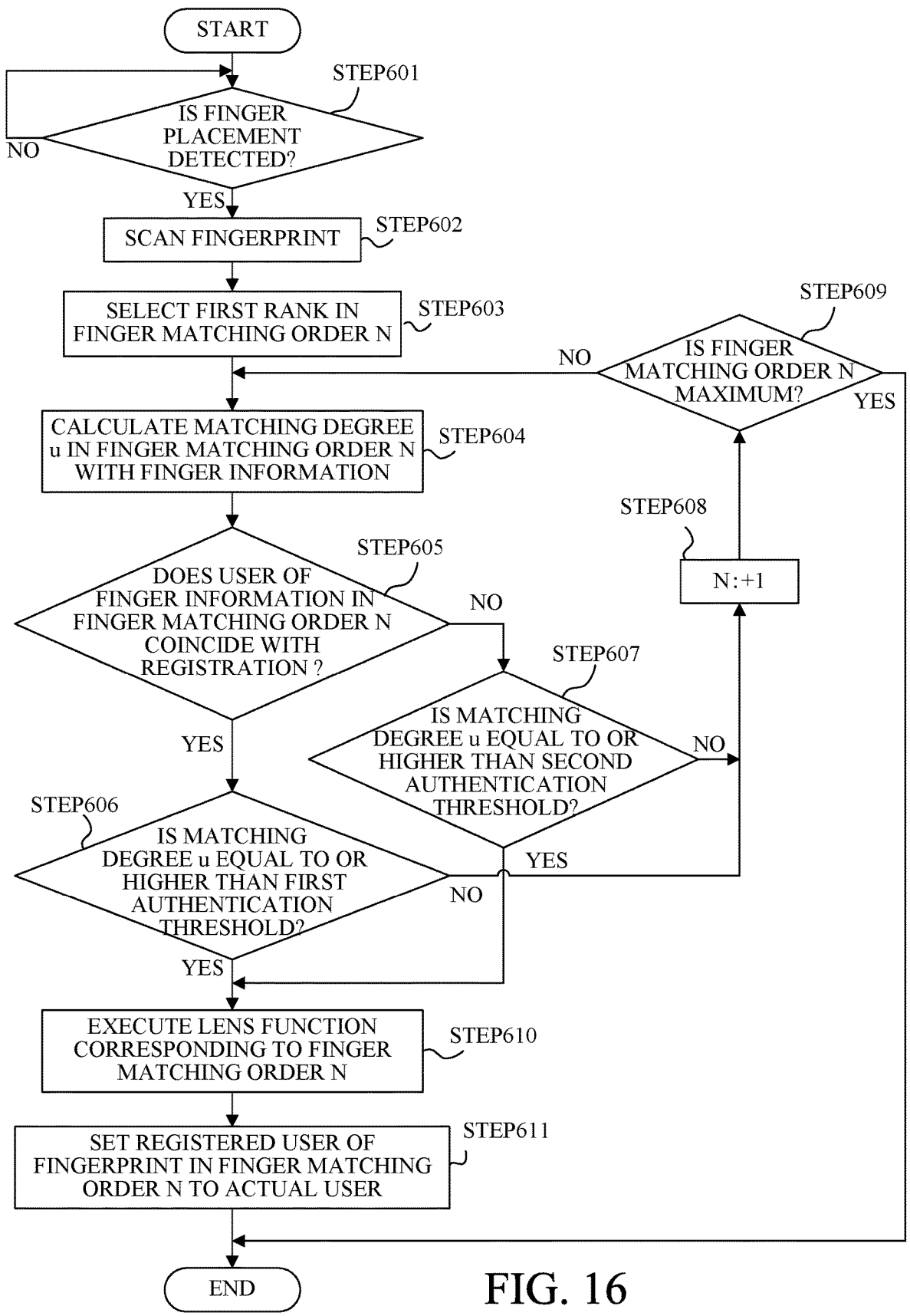
FIG. 16 is a flowchart of a display and voice changing process according to the third embodiment.

A flowchart illustrated in FIG. 16 illustrates a flow of the process that changes the display and sound using the fingerprint sensor 61. The processes of the steps 601 to 604 are similar to those of the steps 301 to 304 illustrated in FIG. 10 in the second embodiment. The processes of the steps 606 to 611 are similar to those of the steps 306 to 311 illustrated in FIG. 10 in the second embodiment. In the step 605, the navigation microcomputer 52 determines whether the registered user corresponding to the registered fingerprint of the finger matching order Nk is authenticated as the actual user by the navigation microcomputer 52. If so, the navigation microcomputer 52 moves to the step 606, and if not, the navigation microcomputer 52 moves to the step 607.

The matching degree u may deteriorate as the finger state of the user that drives the automobile for a long time changes due to sweat and contaminations. Even in this case, this procedure lowers a first authentication threshold (step 606) to be compared with the matching degree, as long as the user just previously used the function of the car navigation apparatus 50 through the fingerprint sensor 61. Hence, the user can continue to instruct the car navigation apparatus 50 to execute each function of through the fingerprint sensor 61. In particular, since the driver of the automobile always grabs the steering wheel and his finger state tends to change, this procedure is effective. Even when the finger of the user is injured, he is authenticated as the actual user with another finger and the authentication threshold can be lowered. Even when the fingerprint sensor 61 scans the injured finger, the car navigation apparatus 50 can execute the intended function.

Where a fingerprint of a user different from an actual user who has already been authenticated is detected and authenticated, the registered user corresponding to the fingerprint can be authenticated as the actual user. Hence, once the authentication is performed after the actual user changes, the fingerprint of the changed actual user becomes easily to be authenticated and the changed user can comfortably operate the car navigation apparatus 50.

Fourth Embodiment

Figure 17:
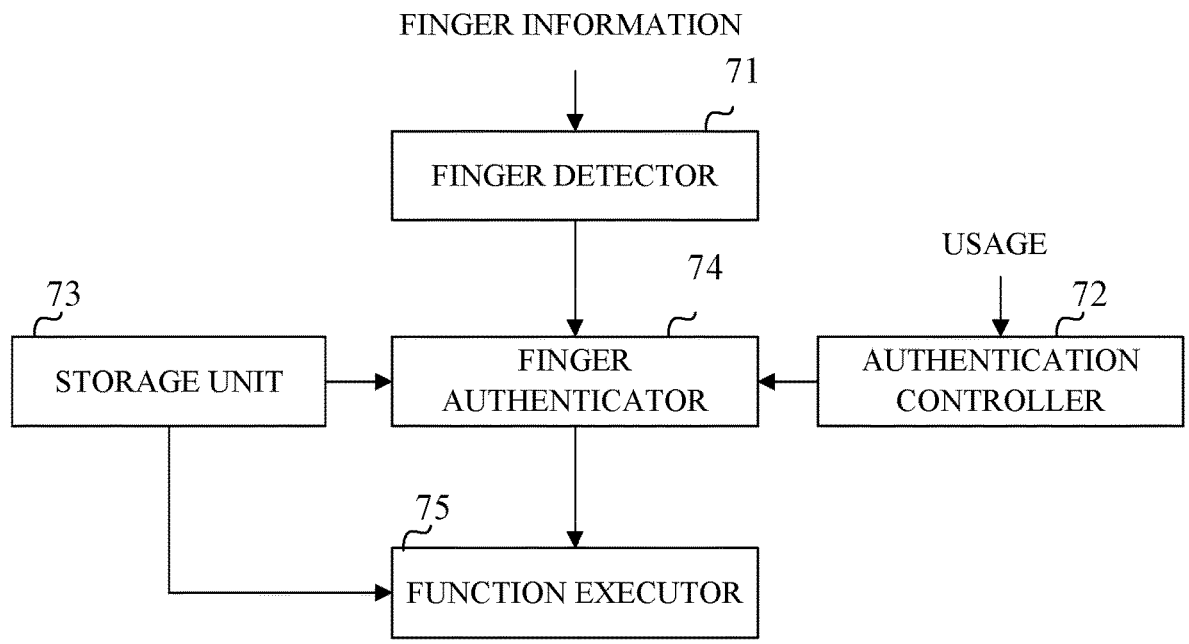
FIG. 17 is a block diagram of a configuration of an electronic apparatus according to a fourth embodiment of the present invention.

FIG. 17 illustrates a configuration of an electronic apparatus according to a fourth embodiment of the present invention. This electronic apparatus can execute a plurality of functions different from the finger authenticating function. The electronic apparatus includes a finger detector 71, a storage unit (memory) 73, a finger authenticator 74, an authentication controller 72, and a function controller 76.

The finger detector 71 detects finger information representing a feature of a finger of a user, such as a fingerprint. The finger information detected by the finger detector 71 will be referred to as detected finger information. The storage unit 73 previously stores a plurality of pieces of registered user information representing a plurality of users (registered users), a plurality of pieces of registered finger information representing a plurality of fingers, such as an index finger, a middle finger, and a ring finger, of each of a plurality of registered users, and a function corresponding to each registered finger information among a plurality of functions The finger authenticator 74 matches (compares) the detected finger information obtained by the finger detector 71 with the plurality of pieces of registered finger information stored (registered) in the storage unit 73 in the matching rank as the predetermined order, and identifies the registered finger information that coincides with the detected finger information. This configuration authenticates the finger of the actual user. More specifically, the finger authenticator 74 calculates the matching degree between the detected finger information and the registered finger information, and determines that the detected finger information coincides with the registered finger information when the matching degree is equal to or higher than the authentication threshold.

The authentication controller 72 detects the status of use of the electronic apparatus, sets (changes) the finger authentication condition according to the detected status of use, such as the matching お order of the registered finger information with the detected finger information by the finger authenticator 74. The status of use relates to use of the electronic apparatus, such as a function in use, a set operation mode, and an actual user of the electronic apparatus. The authentication controller 72 serves as a user identifier that identifies or authenticates the actual user by obtaining the user identification information indicative of the actual user or by performing the determination process that determines the actual user. In this case, the actual user may be identified by using the detected finger information obtained by the finger detector 71 as the user identification information. The determination process of the actual user may be performed with the face information detected in image data generated by the electronic apparatus.

The function controller 75 executes the function corresponding to a finger (registered finger information that coincides with the detected finger information) authenticated by the finger authenticator 74 among the plurality of functions stored in the storage unit 73.

This embodiment is applicable to the interchangeable lens described in the next fifth embodiment as well as the car navigation apparatus described in the third embodiment. Even in this case, as described in the third embodiment, the user identification information may be obtained by detecting the cell phone which the actual user uses.

Fifth Embodiment

A description will now be given of a camera system that includes an interchangeable lens according to a fifth embodiment of the present invention and a camera body to which the interchangeable lens is detachably attached. The configuration of the camera system according to this embodiment is similar to that described with reference to FIGS. 2, 3, and 4. Those elements in this embodiment, which are corresponding elements in the second embodiment, will be designated by the same reference numerals as those of the second embodiment.

In this embodiment, the lens microcomputer 17 selects one of user preferential matching and function preferential matching in the finger authentication. The user preferential matching initially determines the registered user for the finger authentication in accordance with the user matching order set based on the user identification information, and then compares the registered fingerprint corresponding to each registered lens function with the detected fingerprint according to the function matching order set for each registered user. On the other hand, the function preferential matching initially determines the registered fingerprint (or the registered lens function) to be compared with the detected fingerprint in accordance with the function matching order, and authenticates the finger of the registered user in accordance with the user matching order for each registration lens function. An example will be provided with reference to FIG. 5 used for the second embodiment. Assume that the user matching order is X→Y, the function matching order AF/MF switch function→image stabilization ON/OFF function→illumination ON/OFF function. In this case, the user preferential matching authenticates the finger in order of the fingerprint A→B→C→D→E→F. On the other hand, the function preferential matching authenticates the finger in order of the fingerprint A→D→B→E→C→F.

Figure 18:
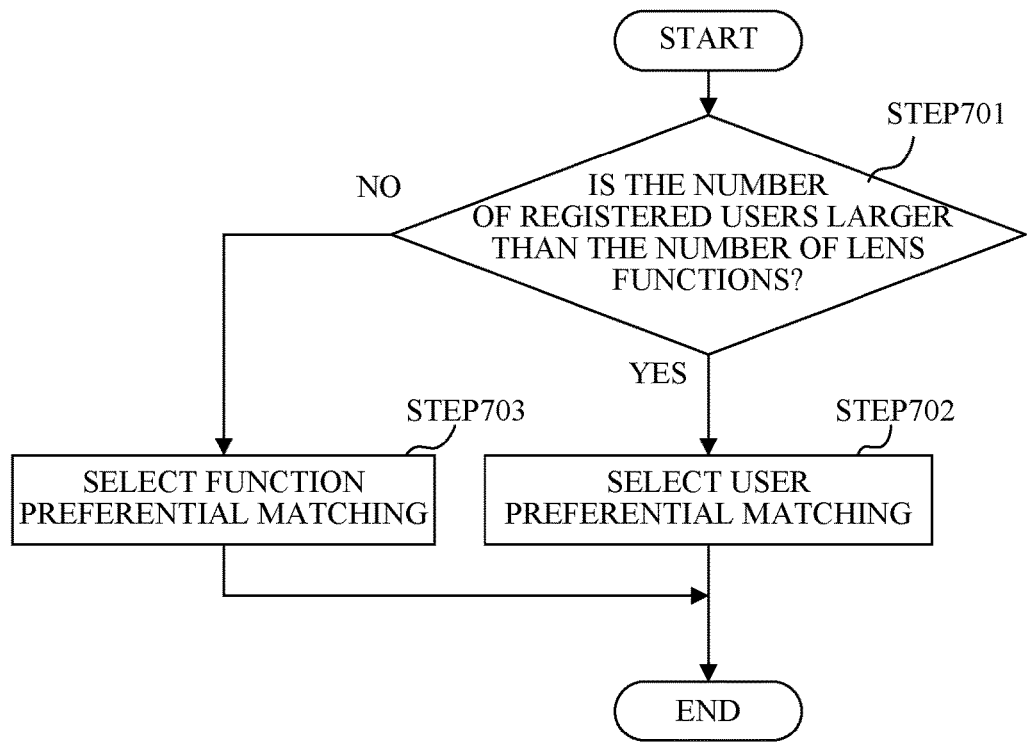
FIG. 18 is a flowchart of a preferential matching determining process in an interchangeable lens according to a fifth embodiment.

A flowchart illustrated in FIG. 18 illustrates a flow of a preferential matching determining process for the lens microcomputer 17 to select one of the user preferential matching and the function preferential matching.

In the step 701, the lens microcomputer 17 compares the number of registered users with the number of registered lens functions, and determines whether the number of registered users is larger than the number of registered lens functions. The lens microcomputer 17 moves to the step 702 so as to select the user preferential matching when the number of registered users is more, and ends this process. On the other hand, the lens microcomputer 17 moves to the step 703 so as to select the function preferential matching when the number of registered users is less, and ends this process.

This process determines an order of finger authentication so as to prioritize one of the registered user and the registered lens function which has a larger number. Hence, the registered fingerprint and the detected fingerprint can be efficiently matched in order of on a higher rank combination in the matching orders of the registered user and the registered lens function, and it is possible to shorten a time period from when the detected fingerprint is obtained to when the corresponding lens function is executed.

Even without this process, if it is possible to determine more likely one of the user preferential matching and the function preferential matching, more likely preferential matching may be fixedly used.

The user matching order setting process according to this embodiment is similar to that of the second embodiment with reference to FIG. 8, and a description thereof will be omitted.

Next follows a description of a function matching order setting method according to this embodiment. The initial function matching order before the status of use of the interchangeable lens is considered is set, as described above, in order of the AF/MF switch function→the image stabilization ON/OFF function→the illumination ON/OFF function, based on the use of the interchangeable lens by a general user.

The initial function matching order may be updated according to the use history. This configuration can provide an update to the function matching order in order of a more frequent function based on the use history, and can shorten a time period from when the detected fingerprint is obtained to when the corresponding lens function is executed.

Figure 19:
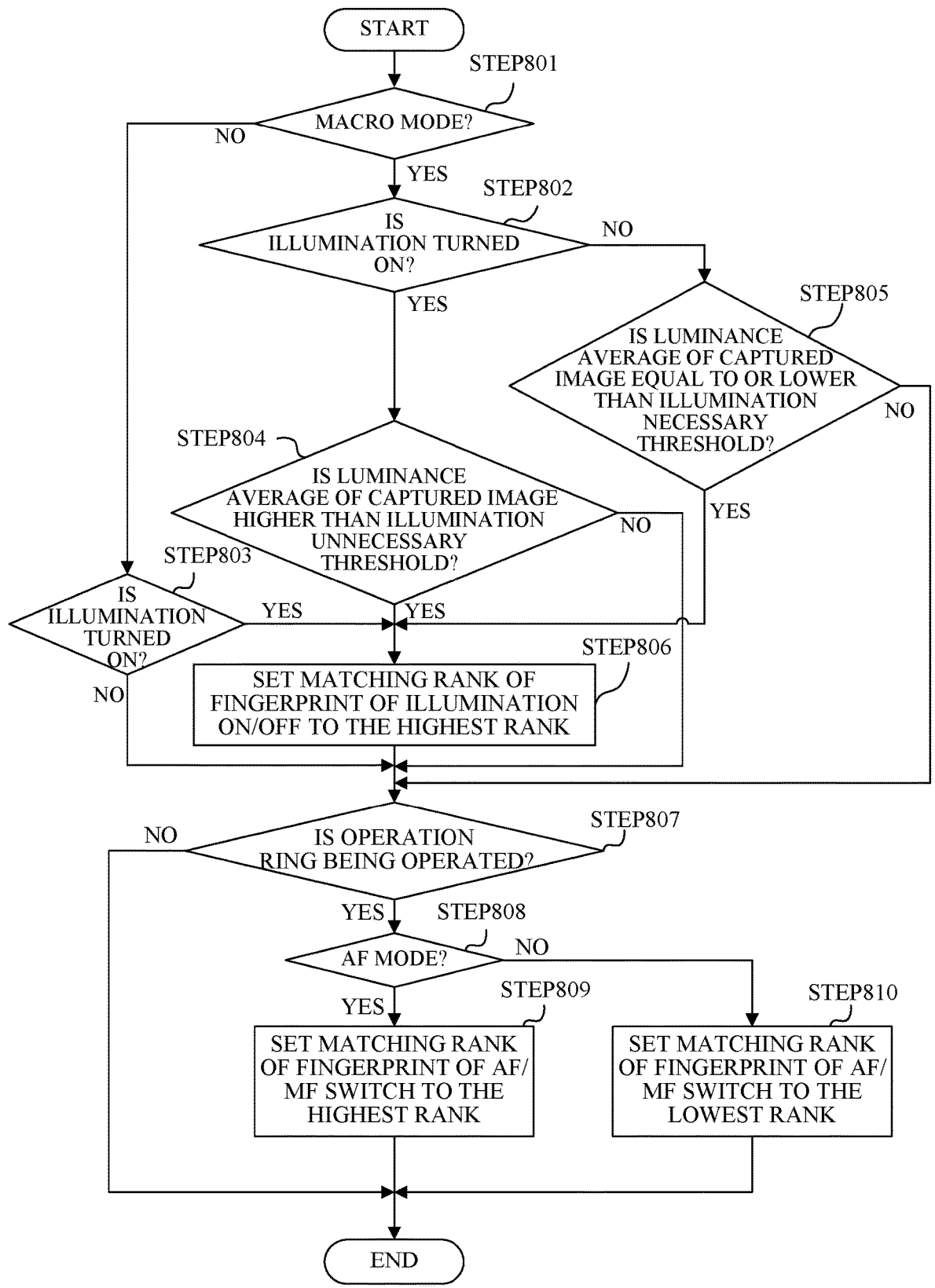
FIG. 19 is a flowchart of a function matching order setting process according to the fifth embodiment.

A flowchart illustrated in FIG. 19 illustrates a flow of the function matching order setting process that rearranges the initial function matching order according to the status of use, and changes (updates) the function matching order. The status of use relates to use of the interchangeable lens, such as a lens function in use in the interchangeable lens, a set operation mode (imaging mode, such as a macro mode, and a focus mode, such as AF/MF mode), and an actual user.

In the step 801, the lens microcomputer 17 communicates with the camera microcomputer 23, and determines whether the imaging mode is the macro mode. The lens microcomputer 17 moves to the step 802 in the macro mode, and to the step 803 in the non-macro mode.

In the step 802, the lens microcomputer 17 determines whether the LED 13 is turned on. The lens microcomputer 17 moves to the step 804 when the LED 13 is turned on, and to the step 805 when the LED 13 is turned off.

In the step 803, the lens microcomputer 17 determines whether the LED 13 is turned on. The lens microcomputer 17 moves to the step 806 when the LED 13 is turned on, and to the step 807 when the LED 13 is turned off.

In the step 804, the lens microcomputer 17 communicates with the camera microcomputer 23, and determines whether the luminance average of image data (captured image) is equal to or higher than the illumination unnecessary threshold. The lens microcomputer 17 moves to the step 806 when the luminance average is equal to or higher than the illumination unnecessary threshold, and to the step 807 when the luminance average is lower than the illumination unnecessary threshold. The illumination unnecessary threshold is similar to that of the second embodiment for the step 205 in FIG. 9.

In the step 805, the lens microcomputer 17 communicates with the camera microcomputer 23, and determines whether the luminance average of the captured image is equal to or lower than the illumination necessary threshold. The lens microcomputer 17 moves to the step 806 when the luminance average is equal to or lower than the illumination necessary threshold, and to the step 807 when the luminance average is higher than the illumination necessary threshold. The illumination necessary threshold is similar to that in the second embodiment for the step 206 in FIG. 9.

In the step 806, the lens microcomputer 17 sets a matching rank of the registered fingerprint corresponding to the illumination ON/OFF function to the top rank, and moves to the step 807.

In the step 807, the lens microcomputer 17 determines whether the focus operation ring 30 is being operated or moved. The lens microcomputer 17 moves to the step 908 when the focus operation ring 30 is being operated, and ends this process when the focus operation ring 30 is not being operated.

In the step 808, the lens microcomputer 17 determines whether the AF mode is set. The lens microcomputer 17 moves to the step 809 in the AF mode, and to the step 810 in the non-AF mode (or the MF mode).

In the step 809, the lens microcomputer 17 sets a matching rank of the registered fingerprint corresponding to the AF/MF switch function to the highest rank, and ends this process.

In the step 810, the lens microcomputer 17 sets a matching rank of the registered fingerprint corresponding to the AF/MF switch function to the lowest rank, and ends this process.

The processes of the steps 801 to 806 can move up a matching rank of the registered fingerprint corresponding to the illumination ON/OFF function when the LED 13 is turned off, the imaging mode is the macro mode, and the captured image is dark. When it is determined that the LED 13 turns on and the imaging mode is not the macro mode or the captured image is sufficiently bright, a matching rank of the registered fingerprint corresponding to the illumination ON/OFF function can be moved up. When it is necessary to turn off the LED 13, the registered fingerprint corresponding to the turning off of the LED 13 is preferentially compared with the detected fingerprint. This configuration can shorten a time period from when the detected fingerprint is obtained to when the LED 13 is turned on or off.

The processes of the steps 807 to 810 enable a matching rank of the registered fingerprint corresponding to the AF/MF switch function to move up when the AF mode is set as soon as the focus operation ring 30 is operated. Therefore, when the user attempts to adjust the focus state to the MF in the AF mode, the registered fingerprint corresponding to the MF mode is preferentially compared with the detected fingerprint. On the other hand, when the MF mode is set as soon as the operation of the focus operation ring 30 is detected, a matching rank of the registered fingerprint corresponding to the AF/MF switch function can be lowered. In other words, the registered fingerprint corresponding to a switch to the AF mode is not preferentially compared with the detected fingerprint. This configuration can properly set the matching order of the registered fingerprint corresponding to the AF/MF switch function according to the status of use of the interchangeable lens 1, and shorten a time period from when the detected fingerprint is obtained to when the AF mode is switched to the MF mode where the user attempts to switch to the MF mode.

This procedure performs the processes of the steps 801 to 806 when determining that the frequency in use of the AF/MF switch function is higher than that of the illumination ON/OFF function, and then performs the steps 807 to 810. In other words, where it is determined that both of the AF/MF switch function and the illumination ON/OFF function are likely selected by the finger authentication based on the status of use, a matching rank of the registered fingerprint corresponding to the AF/MF switch function is set to a higher rank. Thereby, the matching order of the registered fingerprint with the detected fingerprint can be more properly set.

A weighing value may be set to each of the status of use relating to the processes of the steps 801 to 806 and the status of use relating to the processes of the steps 807 and

810, and the matching rank may be changed according to the weighing value. This configuration can properly set the matching order of the registered fingerprint when there are many lens functions to be changed by the finger authentication.

The processes illustrated in FIGS. 18, 8, and can further shorten a time period from when the detected fingerprint is obtained to when the corresponding lens function is executed.

This embodiment selects one of the user preferential matching and the function preferential matching through the finger authentication, but a weighing value is calculated for each of the registered user and the registered lens function and ranking of the registered user and the registered lens function may be determined in order of a large weighing value. Initially, a process similar to that illustrated in FIG. 8 is performed and a weighing value is set to the user weighing value in order of a higher matching rank among the plurality of registered user. Next, a process similar to that illustrated in FIG. 19 is performed and a weighing value is set to a function weighing value in order of a higher matching rank among a plurality of registered lens functions. A weighing value for each registered fingerprint is calculated by multiplying the user weighing value by the function weighing value and matching follows in order of a larger weighing value. In this case, the weighing value setting method may not be fixed for each matching order in each process. In other words, the weighing value may be determined based on the likelihood of the actual user of the registered user which can be determined based on the status of use of the interchangeable lens. For example, where it is determined that a registered user detected by the image sensor cannot touch the fingerprint sensor at all based on his location, a user weighing value for that registered user may be made extremely small.

While this embodiment provides ranking based on the general status of use in determining the function matching order, the function matching order may be determined for each registered user by determining a frequency in use of the lens function for each registered user and by performing weighting based on the status of use. This configuration increases information to be stored but can preferentially match the registered fingerprint corresponding to the lens function that is more likely selected for each registered user with the detected fingerprint. As a result, this configuration can shorten a time period from when the registered user having a fingerprint to be matched is determined to when it is authenticated that the detected fingerprint coincides with the registered fingerprint of the registered user.

This embodiment provides ranking based on the status of use in determining the user matching order, but may determine a frequency of the registered user using each lens function, a weight based on the status of use, and the user matching order for each lens function. This configuration increases information to be stored but can preferentially match the registered fingerprint of the registered user for each lens function more likely to be used in the function preference matching. As a result, this configuration can shorten a time period from when the registered lens function with a fingerprint to be matched is determined to when it is authenticated that the detected fingerprint coincides with the registered fingerprint corresponding to the registered lens function.

While the second, third, and fifth embodiments are directed to the interchangeable lens and car navigation apparatus as an illustrative electronic apparatus, each of the processes described in these embodiment is applicable to another electronic apparatus. For example, the process described in the first embodiment is applicable to an electronic apparatus or optical apparatus, such as a camera body (imaging apparatus) to which an interchangeable lens is attached, a lens integrated camera (imaging apparatus), a projector (image projection apparatus), and a smartphone (cell phone).

The process described in the third embodiment is applicable to an electronic apparatus configured to control an air condition, an illumination, etc. in an automobile, an electronic apparatus configured to control an air condition, an illumination, etc. in a building in addition to the automobile, and another electronic apparatus, such as a printer, a copier, and acoustic apparatus.

As described in the second embodiment, the finger authentication in each embodiment is not limited to the fingerprint authentication and may use a vein authentication. The second embodiment authenticates the user of the interchangeable lens through the fingerprint sensor but the user identifying method is not limited to this embodiment and may use information of a micro-chip representing each individual or a resistance value when a micro current is applied to the finger.

Each embodiment can provide an electronic apparatus that has a simple configuration and enables a plurality of users to comfortably and quickly use each function through a finger authentication.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-135148, filed Jul. 7, 2016, which is hereby incorporated by reference herein in its entirety.

What is claimed is:

1. An electronic apparatus configured to execute a plurality of functions, the electronic apparatus comprising:
a memory storing a plurality of pieces of registered finger information respectively representing a plurality of features of a plurality of fingers of each of a plurality of registered users, each of the plurality of functions corresponding to one of the plurality of pieces of registered finger information;
a sensor that detects a feature of a finger of an actual user to generate finger information correspond to the detected feature;
a processor configured to implement stored instructions to execute a plurality of tasks, including:
an authenticating task that identifies one piece of registered finger information, among the plurality of pieces of registered finger information, that coincides with the detected finger information by matching the detected finger information with the plurality of pieces of registered finger information in a predetermined order;
a function executing task that executes one of the plurality of functions corresponding to the one piece of registered finger information identified by the authenticating task;
an order changing task that changes the predetermined order according to a status of use of the electronic apparatus,
wherein the status of use includes one of the plurality of functions in use in the electronic apparatus, an operation mode in setting in the electronic apparatus, surrounding circumstance, and the actual user of the electronic apparatus.

2. The electronic apparatus according to claim 1, further comprising:
a user identifying task that identifies the actual user among the plurality of registered users based on acquired user identification information representing the actual user,
wherein the order changing task uses the actual user identified by the user identifying task for the status of use.

3. The electronic apparatus according to claim 2, wherein the user identifying task identifies the actual user using the detected finger information as the user identification information.

4. The electronic apparatus according to claim 2, wherein the user identifying task acquires the user identification information by detecting a cell phone used by the actual user.

5. The electronic apparatus according to claim 2, wherein the acquired user identification information includes information of a face detected in image data generated by using the electronic apparatus.

6. The electronic apparatus according to claim 2, wherein the user identifying task acquires the user identification information from another apparatus that is communicable with the electronic apparatus.

7. The electronic apparatus according to claim 1, wherein the electronic apparatus is an optical apparatus.

8. The electronic apparatus according to claim 7, wherein the optical apparatus is an interchangeable lens or an imaging apparatus.

* * * * *